United States Patent [19]
Ueki

[11] Patent Number: 6,075,775
[45] Date of Patent: Jun. 13, 2000

[54] METHOD OF CHECKING AND CORRECTING VIRTUAL PATH CONNECTION SELECTION RIGHT OF FIXED-LENGTH CELL HANDLING EXCHANGES

[75] Inventor: Kohei Ueki, Kawasaki, Japan

[73] Assignee: Fujitsu Limited, Kanagawa, Japan

[21] Appl. No.: 08/823,758

[22] Filed: Mar. 25, 1997

[30] Foreign Application Priority Data

Oct. 11, 1996 [JP] Japan ................................ 8-269720

[51] Int. Cl.[7] ............................ G01R 31/08; H04L 12/28
[52] U.S. Cl. ........................ 370/248; 370/236; 370/395
[58] Field of Search ................................. 370/397, 399, 370/409, 389, 395, 244, 410, 241, 242, 248, 235, 236, 237, 396, 400, 443, 444, 461, 462; 709/235, 238, 239, 240

[56] References Cited

U.S. PATENT DOCUMENTS

| 5,602,826 | 2/1997 | Yoshimura et al. | 370/248 |
|---|---|---|---|
| 5,675,578 | 10/1997 | Gruber et al. | 370/248 |
| 5,864,537 | 1/1999 | Hijikata et al. | 370/235 |
| 5,875,177 | 2/1999 | Uriu et al. | 370/244 |

FOREIGN PATENT DOCUMENTS 2-244998  9/1990  Japan .
2-28453  11/1990  Japan .

Primary Examiner—Hassan Kizou
Assistant Examiner—Hanh Nguyen
Attorney, Agent, or Firm—Helfgott & Karas, P.C.

[57] ABSTRACT

The present invention relates to a technique for a method of checking virtual-path-connection selection rights of fixed-length cell handling exchanges. For each of the virtual path connections, a second fixed-length cell handling exchange notifies, as first message information, a first fixed-length cell handling exchange of the status as to which of the first fixed-length cell handling exchange or the second fixed-length cell handling exchange has a selection right for the virtual path connection. The first fixed-length cell handling exchange that has received the first message information checks whether or not an inconsistency is present in the setting of the virtual-path-connection selection rights, and sends back to the second fixed-length cell handling exchange the result of the check, as second message information. This structure makes it possible to prevent the reduction in efficiency of use of virtual path connections and to efficiently and effectively utilize network resources.

18 Claims, 34 Drawing Sheets

F I G. 24

| Message type (acronym) | | Code |
|---|---|---|
| Initial address | (IAM) | 0000 0001 |
| IAM acknowledgement | (IAA) | 0000 1010 |
| IAM reject | (IAR) | 0000 1011 |

FIG. 25

| Parameter |
|---|
| AAL parameters |
| Additional calling party number |
| ATM cell rate |
| Broadband bearer capability |
| Broadband high layer information |
| Broadband low layer Information |
| Called party number |
| Called party subaddress |
| Calling party number |
| Calling party subaddress |
| Calling party's category |
| Carrier identification code |
| Carrier selection |
| Charge number |
| Closed user group information |
| Connected line ID request |
| <u>Connection element identifier (CEI)</u> |
| Echo control information |
| Forward narrowbnand interworking inds. |
| Location number |
| Maximum end-to-end transit delay |
| MLPP precedence |
| Narrowband bearer capability |
| Narrowband high layer compatibility |
| Narrowband low layer compatibility |
| National/international call indicator |
| Notification |
| OAM traffic descriptor |
| Original called number |
| Original called number |
| Originating line information |
| Origination ISC point code |
| Origination signalling identifier |
| Progress indicator |
| Propagation delay counter |
| Redirecting number |
| Redirection information |
| Segmentation indicator |
| Transit network selection |
| User-to-User indicators |
| User-to-User information |
| Quality-of-Service |

FIG. 26

| Parameter |
|---|
| Connection element identifier (CEI) |
| Destination signalling identifier |
| Origination signalling identifier |

FIG. 27

| Parameter |
|---|
| Automatic congestion level<br>Cause indicators<br>Destination signalling identifier |

F I G. 30

| Message type (acronym) | Code |
|---|---|
| Blocking (BLO) | 0001 0011 |
| Blocking acknowledgement (BLA) | 0001 0101 |
| Consistency check request (CCR) | 0000 0101 |
| Consistency check request acknowledgement (CCRA) | 0001 0001 |
| Consistency check end (CCE) | 0001 0111 |
| Consistency check end acknowledgement (CCEA) | 0001 1000 |

FIG. 31

| Parameter |
|---|
| Origination signalling identifier<br>Resource identifier |

F I G. 32

| Parameter |
|---|
| Destination signalling identifier<br>Origination signalling identifier |

METHOD OF CHECKING AND CORRECTING VIRTUAL PATH CONNECTION SELECTION RIGHT OF FIXED-LENGTH CELL HANDLING EXCHANGES

BACKGROUND OF THE INVENTION

(1) Field of the Invention

The present invention relates to a method of checking virtual-pass-connection selection rights of fixed-length cell handling exchanges and to a method of checking and correcting virtual-pass-connection selection rights of fixed-length cell handling exchanges, both methods being suitable for use in checking whether or not an inconsistency is present in the setting of the selection rights of a plurality of adjacent exchanges for virtual path connections provided therebetween, in BISUP [Broadband ISDN (or B-ISDN) User's Part], which is the interexchange signal method for providing SVC (Switched Virtual Connection) services through B-ISDN (Broadband Aspects of ISDN). Moreover, the present invention relates to fixed-length cell handling exchanges to which the above-described methods are applied.

(2) Description of the Related Art

Through B-ISDN, it is possible to provide SVC services for establishing VPC (virtual path connection) among a plurality of ATM (Asynchronous Transfer Mode) exchanges, as required. ITU-T recommendations define a BISUP (B-ISDN User's Part) as a standardized interexchange signal method for providing SVC services.

According to the requirements of BISUP, one or a plurality of VPCs are provided between a plurality of adjacent ATM exchanges in order to transfer data among them. For example, each VPC provided between two adjacent ATM exchanges is selected by only one of the ATM exchanges when call/connection is established between the two ATM exchanges.

In other words, when establishing call/connection between two ATM exchanges, each of the ATM exchanges can possess selection rights for (or capture) different VPCs from among the plurality of VPCs.

More specifically, according to the requirements of ITU-T recommendations, an ATM exchange having a larger SPC (Signaling Point Code)—which is an identification code for an exchange—(or a larger SPC number) has selection rights for VPCs having even identification numbers (VPCIs: VPC Identifiers), whereas an ATM exchange having a smaller SPC number has selection rights for VPCs having odd VPCI numbers.

When a certain ATM exchange (hereinafter often referred to simply as an "exchange") establishes call/connection with another exchange, one VPC is selected from VPCs for which the certain exchange has a selection right. If the VPCs for which the certain exchange has selection rights are all used, selection of the VPC is left to the other exchange.

In this way, when the two exchanges need to individually establish call/connection at the same time, they are prevented from selecting an identical VPC.

It is also possible to arbitrarily set a VPC selection right according to the agreement between two exchanges rather than according to the default requirements defined by the previously-described ITU-T recommendations or the like. For example, the VPC selection right may be set according to the VPCI number.

A maintenance technician sets a selection right for VPCs when an exchange is (newly or additionally) installed.

Specifically, with reference to the setting of the VPC selection rights of the other adjacent exchanges, the maintenance technician sets the VPC selection right of the thus-installed exchange such that it differs from (or is consistent with) the setting of the VPC selection rights of the other exchanges.

The details of the setting of VPC selection rights set by the maintenance technician are retained through use of a selection right availability table in which selection-right availability is set for each of VPCs for which the exchange has selection rights, and a route table which stores an aggregation of VPCs (or routes).

In contrast, N-ISDN (Narrowband Aspects of ISDN) adopts a method of providing one exchange with priority to select VPCs in lieu of the previously-described method of providing one of the two exchanges with a selection right for VPCs.

In the case where selection rights for VPCs are set according to the agreement between the two exchanges, the selection rights are set by operations of the maintenance technician. The maintenance technician sometimes sets the VPC selection rights of the two exchanges erroneously, thereby resulting in inconsistencies in the setting of the VPC selection rights of the two exchanges (or the setting of the selection right availability table or the route table).

Specifically, inconsistencies arise in the setting of the VPC selection rights in the cases; for example, where two exchanges are set such that both of them have selection rights for a certain VPC; where two exchanges are set such that neither has a selection right for any of the VPCs; or where two exchanges are set such that neither has a selection right for a certain VPC.

If two exchanges are set such that both of them have selection rights for a certain VPC, a collision of VPC selection occurs when the two exchanges attempt to establish call/connection individually through an identical VPC at the same time, thereby resulting in incomplete establishment of call/connection (the VPC cannot be used at this time).

With such inconsistent setting of the VPC selection rights, incomplete call/connection occur frequently, thereby rendering the VPC unusable for a relatively permanent period. As a result, the efficiency of use of the VPCs is deteriorated.

If two exchanges are set such that neither has a right to use any of the VPCs, it becomes impossible to establish call/connection between them.

As described above, if two exchanges are set such that both of them have selection rights for a certain VPC, the maintenance technician acknowledges a collision of selection of the VPC. If two exchanges are set such that neither has a selection right for any of the VPCs, the maintenance technician acknowledges an inability to establish call/connection between them. In either case, it is possible for the maintenance technician to acknowledge inconsistencies in the setting of VPC selection rights.

These inconsistencies in the setting of VPC selection rights are not acknowledged before the exchanges start offering services through the corresponding VPC. Therefore, it is impossible to find an inconsistency in the setting of selection rights for each VPC before the VPC is put into service.

In contrast, if two exchanges are set such that neither has a selection right for a certain VPC, the VPC remains unavailable between these two exchanges for a relatively permanent period. Therefore, the efficiency of use of VPCs is deteriorated, as well.

However, if two exchanges are set such that neither has a selection right for a certain VPC, the maintenance technician will not acknowledge that the VPC is unavailable. Consequently, it is impossible to find an inconsistency in the setting of VPC selection rights.

Even if an inconsistency in the setting of VPC selection rights is found after both exchanges have commenced use of VPCs, it is impossible to automatically correct the inconsistency in the setting of the VPC selection rights in the BISUP. Therefore, it is impossible to prevent the reduction in efficiency of use of VPCs.

SUMMARY OF THE INVENTION

The present invention has been conceived in view of the aforementioned problems. An object of the present invention is to provide a method of checking virtual-pass-connection selection rights of fixed-length cell handling exchanges, a method of checking and correcting virtual-pass-connection selection rights of fixed-length cell handling exchanges, and a fixed-length cell handling exchange that make it possible to previously check whether or not an inconsistency is present in the setting of virtual-path-connection selection rights of adjacent exchanges and to automatically correct the setting of the virtual-path-connection selection rights if the setting includes an inconsistency, thereby preventing the reduction in efficiency of use of virtual path connections and efficiently and effectively utilizing network resources.

To these ends, the present invention provides a method of checking virtual-path-connection selection rights of fixed-length cell handling exchanges, wherein when selection rights for one or more virtual path connections to be set between fixed-length cell handling exchanges are checked, for each of the virtual path connections, a second fixed-length cell handling exchange notifies, as first message information, a first fixed-length cell handling exchange of the status as to which of the first fixed-length cell handling exchange or the second fixed-length cell handling exchange has a selection right for the virtual path connection; and the first fixed-length cell handling exchange that has received the first message information checks whether or not an inconsistency is present in the setting of the virtual-path-connection selection rights, and sends back to the second fixed-length cell handling exchange the result of the check, as second message information.

In the method of checking virtual-pass-connection selection rights of fixed-length cell handling exchanges according to the present invention, it is possible to find a virtual path connection for which selection rights are inconsistently set, whereby the reduction in efficiency of use of virtual path connections can be prevented, and network resources can be efficiently and effectively utilized.

Further, the present invention provides a method of checking and correcting virtual-pass-connection selection rights of fixed-length cell handling exchanges, wherein when virtual-pass-connection selection rights of fixed-length cell handling exchanges are checked and corrected, for each of the virtual path connections, a second fixed-length cell handling exchange notifies, as first message information, a first fixed-length cell handling exchange of the status as to which of the first fixed-length cell handling exchange or the second fixed-length cell handling exchange has a selection right for the virtual path connection; and the first fixed-length cell handling exchange that has received the first message information checks whether or not an inconsistency is present in the setting of the virtual-path-connection selection rights, and sends back to the second fixed-length cell handling exchange the result of the check, as second message information, and wherein when it is detected that an inconsistency is present in the setting of the selection rights, the virtual-path-connection-rights of the two fixed-length cell handling exchanges are changed so as to comply with selection rights specified by either of the two fixed-length cell handling exchanges.

In the method of checking and correcting virtual-pass-connection selection rights of fixed-length cell handling exchanges according to the present invention, it is possible to prevent the reduction in use efficiency of virtual path connections and, hence, to efficiently and effectively utilize network resources by finding a virtual path connection for which selection rights are inconsistently set and then correcting the setting of selection rights for the virtual path connection if the setting includes an inconsistency.

The present invention also provides a fixed-length cell handling exchange that has one or more virtual path connections established with another fixed-length cell handling exchange, the exchange comprising:

a virtual path connection information acquisition section for acquiring information with regard to virtual path connections for which selection rights of the other fixed-length handling exchange are set;

an inconsistency detection section for checking whether or not an inconsistency is present in the setting of selection rights based on information with regard to the virtual path connections for which the selection rights of the fixed-length cell handling exchange are set, and the virtual path connection information fetched by the virtual path connection acquisition section; and a first selection right change section for changing the selection rights of the two fixed-length cell handling exchanges for the virtual path connection so as to comply with selection rights specified by the other fixed-length cell handling exchange if it is detected by the inconsistency detection section that the setting of the selection rights includes an inconsistency.

In the fixed-length cell handling exchange of the present invention, it is possible to prevent the reduction in efficiency of use of virtual path connections and to efficiently and effectively utilize network resources.

The present invention provides a fixed-length cell handling exchange that has one or more virtual path connections established with another fixed-length cell handling exchange, the exchange comprising:

a selection right information notification section for notifying the other fixed-length cell handling exchange as to which one of the two exchanges has a selection right for a virtual path connection; and a second selection right change section for changing the selection rights of the two fixed-length cell handling exchanges for the virtual path connection so as to comply with selection rights specified by the other fixed-length cell handling exchange, in the event of having received information regarding an inconsistency detected in the setting of the selection right from the other fixed-length cell handling exchange as an answer to the notification of the selection right notification section.

In the fixed-length cell handling exchange of the present invention, it is possible to prevent the reduction in efficiency of use of virtual path connections and to efficiently and effectively utilize network resources.

BRIEF DESCRIPTION OF THE DRAWINGS

FIG. 24 is a table showing messages used in BISUP;

FIG. 25 is a table showing parameters included in IAM;

FIG. 26 is a table showing parameters included in IAA;

FIG. 27 is a table showing parameters included in IAR;

FIG. 30 is a table showing messages used in CCP;

FIG. 31 is a table showing parameters included in CCR;

FIG. 32 is a table showing parameters included in CCRA;

DESCRIPTION OF THE PREFERRED EMBODIMENTS (a) Aspects of the Present Invention The aspects of the present invention will be described first with reference to the accompanying drawings.

Figure 1:
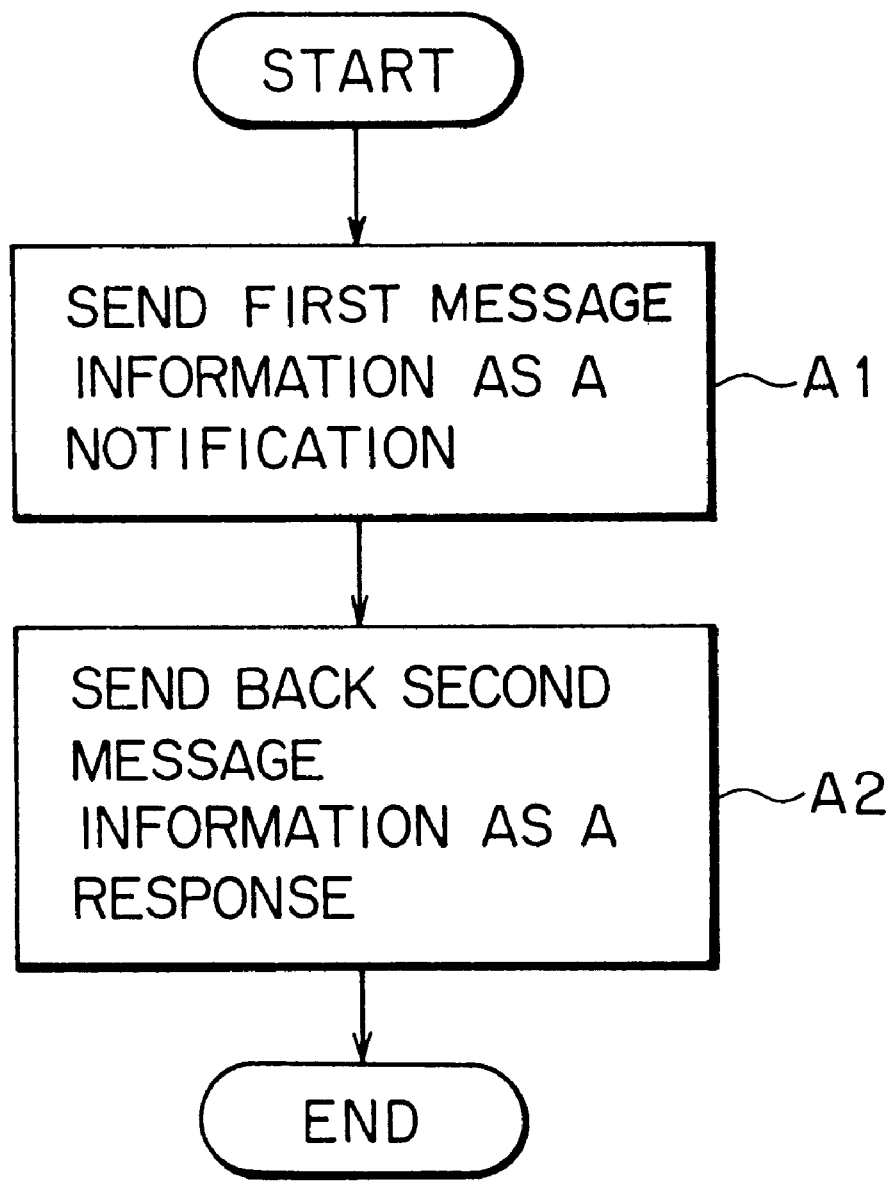
FIG. 1 is a flowchart for explaining the aspect of a method of checking rights of fixed-length cell handling exchanges to select a virtual path connection.

FIG. 1 is a flowchart for describing the aspect of a method of checking virtual-pass-connection selection rights of fixed-length cell handling exchanges. The virtual-path-connection selection right checking method shown in FIG. 1 is used in checking the selection rights of fixed-length cell handling exchanges for one or more virtual path connection to be provided between the fixed-length cell handling exchanges. The method comprises a first message information notification step (step A1) and a second message information answering step (step A2).

In the first message information notification step (step A1), for each virtual path connection, a second fixed-length cell handling exchange sends a first fixed-length cell handling exchange first message information as to which of the first fixed-length cell handling exchange or the second fixed-length cell handling exchange has a selection right.

In the second message information notification step (step A2), the first fixed-length cell handling exchange that received the first message information in step A1 detects whether an inconsistency is present in the setting of selection rights for virtual path connections and sends the result of such detection to the second fixed-length cell handling exchange as an answer.

In the second message information answering step (step A2), the following may be performed. In a case where the two fixed-length cell handling exchanges are set so as not to have selection rights for a certain virtual path connection, or where the two fixed-length cell handling exchanges are set so as to have selection rights for a certain virtual path connection, the first fixed-length cell handling exchange that received the first message information can detect an inconsistency in the setting of the selection rights.

The first and second message information items may be formed into original message information items that comply with the standardized interexchange scheme. At this time, the first and second message information items may be formed so as to have an identical message identifier.

In addition, the first and second message information items may be formed so as to be included in a message used in carrying out the inconsistency checking procedures specified by the standardizing organization.

In a case where a virtual path connection is newly or additionally provided between the two fixed-length cell handling exchanges, if no inconsistency is present in the setting of selection rights of the two fixed-length cell handling exchanges for the thus-provided virtual path connection before the virtual path connection becomes available for call/connection, this virtual path connection may be brought into a state of being usable for call/connection.

If there is an inconsistency in the setting of selection rights for a virtual path connection that is provided between the two fixed-length cell handling exchanges and is in a state of being usable for call/connection, the virtual path connection may be brought into a state of being unusable for call/connection.

In the method of checking a selection right for a virtual path connection provided between fixed-length cell handling exchanges, according to the present invention, for each virtual path connection, a second fixed-length cell handling exchange sends to a first fixed-length cell handling exchange first message information as to which of the first fixed-length cell handling exchange or the second fixed-length cell handling exchange has a connection selection right. The first fixed-length cell handling exchange that received the first message information detects a presence or absence of an inconsistency in the setting of selection rights for virtual path connections and sends the result of such detection to the second fixed-length cell handling exchange as an answer. In this way, it is possible to find a virtual path connection for which selection rights are inconsistently set. As a result, it is possible to prevent the reduction in efficiency of use of virtual path connections and to efficiently and effectively utilize network resources.

Since the first and second message information items have an identical message identifier, a message can be easily prepared by changing only the type of parameter, thereby eliminating needless setting of many types of message.

Since the first and second message information items are included in a message used in carrying out the inconsistency checking procedures defined by the standardizing organization, a message can be easily prepared, thereby eliminating needless setting of many types of message.

In a case where a virtual path connection is newly or additionally provided between the two fixed-length cell handling exchanges, if selecting rights of the two fixed-length cell handling exchanges for the thus-provided virtual path connection are consistent, this virtual path connection is brought into a state of being usable for call/connection. Further, if there is an inconsistency in the setting of the selection rights for the virtual path connection that is provided between the two fixed-length cell handling exchanges and is in the state of being usable for call/connection, the virtual path connection is brought into a state of being unusable for call/connection. As a result, the reduction in efficiency of use of virtual path connections is prevented, and efficient and effective utilization of network resources can be effected.

Figure 2:
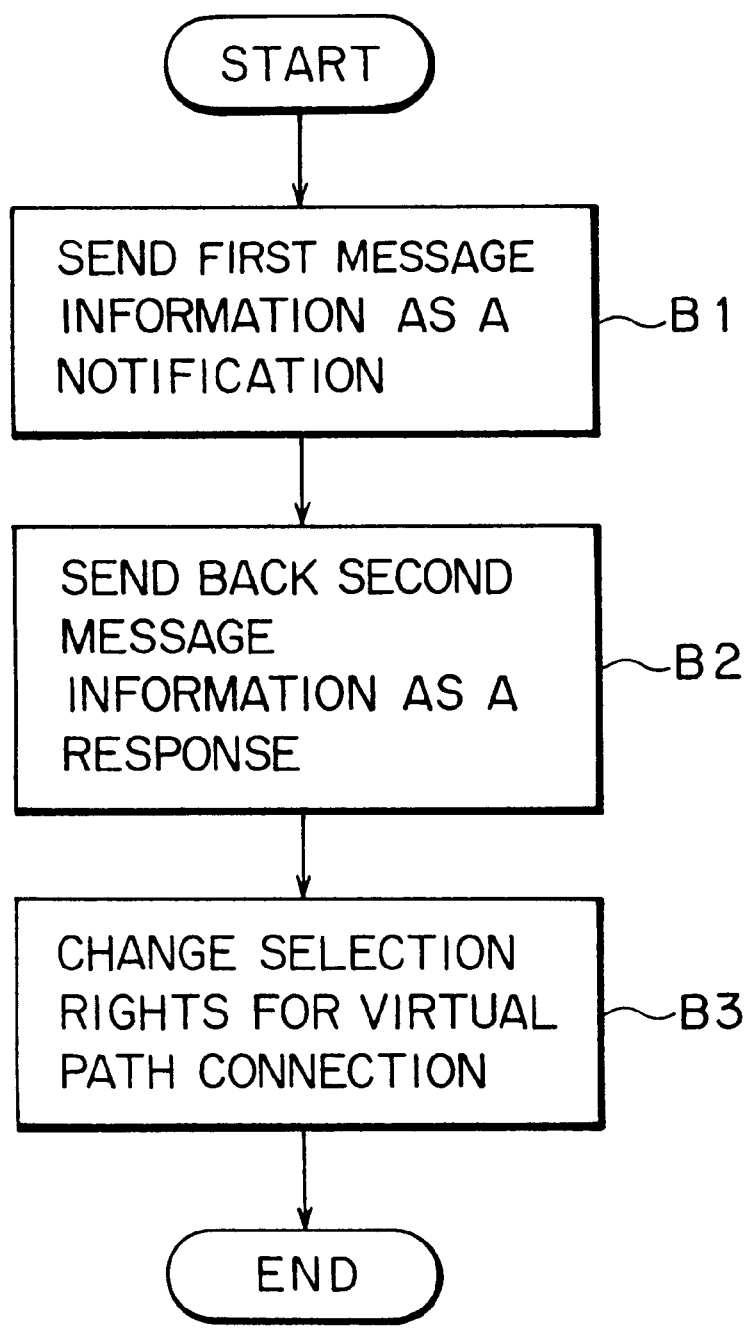
FIG. 2 is a flowchart for explaining the aspect of a method of checking and correcting rights of fixed-length cell handling exchanges to select a virtual path connection.

FIG. 2 is a flowchart for describing the aspect of a method of checking and correcting virtual-pass-connection selection rights of fixed-length cell handling exchanges. The virtual-path-connection selection right checking and correcting method shown in FIG. 2 is used in checking and correcting rights of the fixed-length cell handling exchanges to select one or more virtual path connections provided between the fixed-length cell handling exchanges. The method comprises a first message information notification step (step B1), a second message information answering step (step B2), and a virtual-path-connection selection right change step (step B3).

In the first message information notification step (step B1), for each virtual path connection, a second fixed-length cell handling exchange sends to a first fixed-length cell handling exchange first message information as to which of the first fixed-length cell handling exchange or the second fixed-length cell handling exchange has a selection right.

In the second message information notification step (step B2), the first fixed-length cell handling exchange that received the first message information in step B1 detects whether or not an inconsistency is present in the setting of the selection rights for the virtual path connections and sends the result of such detection to the second fixed-length cell handling exchange as an answer.

If it is detected in step B2 that an inconsistency is present in the setting of selection rights, the virtual-path-connection rights of the two fixed-length cell handling exchanges are changed so as to comply with the selection rights specified by one of the two fixed-length cell handling exchanges (step B3).

If it is detected that an inconsistency is present in the setting of the selection rights, the virtual-path-connection selection rights of the second fixed-length cell handling exchange may be changed so as to comply with the selection rights specified by the first fixed-length cell handling exchange. Alternatively, the virtual-path-connection selection rights of the first fixed-length cell handling exchange may be changed so as to comply with the selection rights specified by the second fixed-length cell handling exchange.

If it is detected that an inconsistency is present in the setting of selection rights, selection rights of the two fixed-length cell handling exchanges for the virtual path connections may be changed so as to comply with the selection rights specified by one of the two fixed-length cell handling exchanges, according to identification numbers assigned to the fixed-length cell handling exchanges.

The first and second message information may be formed into original message information items that comply with the standardized interexchange scheme. At this time, the first and second message information items may be formed so as to have an identical message identifier.

In addition, the first and second message information items may be formed so as to be included in a message used in carrying out the inconsistency checking procedures specified by the standardizing organization.

In the method of checking and correcting virtual-path-connection selection rights of fixed-length cell handling exchanges, according to the present invention, for each virtual path connection, a second fixed-length cell handling exchange sends to a first fixed-length cell handling exchange first message information as to which of the first fixed-length cell handling exchange or the second fixed-length cell handling exchange has a selection right for a virtual path. The first fixed-length cell handling exchange that received the first message information detects a presence or absence of an inconsistency in the setting of the selection rights for the virtual path connection and sends the result of such detection to the second fixedlength cell handling exchange as an answer. If it is detected that an inconsistency is present in the setting of the selection rights, the selection rights of the two fixed-length cell handling exchanges for the virtual path connections are changed so as to comply with the selection rights specified by one of the two fixed-length cell handling exchanges. In this way, the virtual path connections for which selection rights are inconsistently set are checked. If the setting of the selection rights include an inconsistency, the reduction in efficiency of use of virtual path connections is prevented by correcting the setting of selection rights for virtual path connections, and efficient and effective utilization of network resources can be effected.

If it is detected that an inconsistency is present in the setting of the selection rights, the selection rights of the second fixed-length cell handling exchange for the virtual path connections are changed so as to comply with the selection rights specified by the first fixed-length cell handling exchange. Alternatively, the selection rights of the first fixed-length cell handling exchange for the virtual path connections are changed so as to comply with the selection rights specified by the second fixed-length cell handling exchange. Further, the selection rights of the two fixed-length cell handling exchanges for the virtual path connections are changed so as to comply with the selection rights specified by one of the two fixed-length cell handling exchanges, in accordance with identification numbers assigned to the fixed-length cell handling exchanges. As a result, it is possible to check and correct a selection right for a virtual path connection according to the state of the network.

Since the first and second message information items have an identical message identifier, a message can be easily prepared by changing only the type of parameter, thereby eliminating needless setting of many types of message.

Since the first and second message information items are included in a message used in carrying out the inconsistency checking procedures defined by the standardizing organization, a message can be easily prepared, thereby eliminating needless setting of many types of message.

Figure 3:
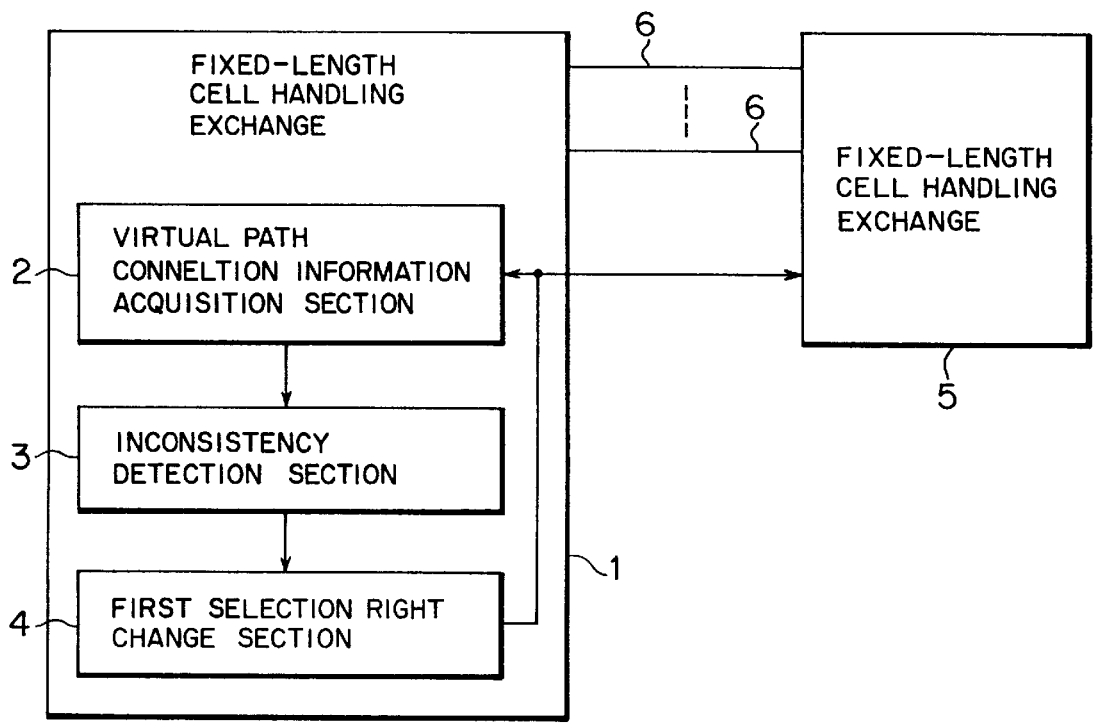
FIG. 3 is a block diagram showing the aspect of configuration of a fixed-length cell handling exchange of the present invention.

FIG. 3 is a block diagram showing the aspect of configuration of the fixed-length cell handling exchange of the present invention. A fixed-length cell handling exchange 1 shown in FIG. 3 establishes one or more virtual path connections 6 with another fixed-length cell handling exchange 5. The fixed-length cell handling exchange 1 is comprised of a virtual path connection information acquisition section 2, an inconsistency detection section 3, and a first selection right change section 4.

The virtual path connection information acquisition section 2 acquires information with regard to the virtual path connections 6 for which selection rights of another fixed-length cell handling exchange 5 are set.

The inconsistency detection section 3 detects a presence or absence of an inconsistency in the setting of the selection rights based on the information regarding the virtual path connections 6 for which selection rights of the selection the fixed-length cell handling exchange 1 are set, and the information regarding the virtual pass connections 6 acquired by the virtual path connection information acquisition section 2.

If the inconsistency detection section 3 has found that the setting of the selection rights include an inconsistency, the first selection right change section 4 changes the selection rights of the two fixed-length cell handling exchanges 1 and 5 for the virtual path connections 6, so as to comply with the selection rights specified by another fixed-length cell handling exchanges 5.

As a result, by virtue of the fixed-length cell handling exchange 1, the reduction in efficiency of use of the virtual path connections 6 is prevented, and efficient and effective utilization of network resources can be effected.

Figure 4:
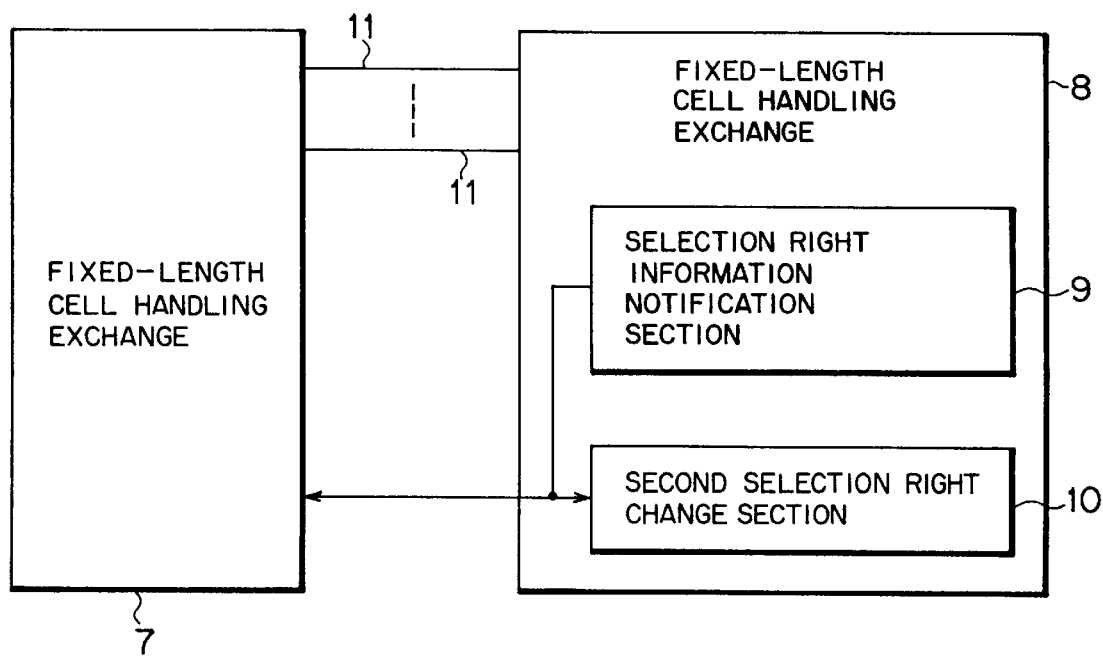
FIG. 4 is a block diagram showing the aspect of configuration of a fixed-length cell handling exchange of the present invention.

FIG. 4 is a block diagram showing the aspect of configuration of the fixed-length cell handling exchange of the present invention. A fixed-length cell handling exchange 8 shown in FIG. 4 establishes one or more virtual path connections 11 with another fixed-length cell handling exchange 7. The fixed-length cell handling exchange 8 is comprised of a virtual path connection information notification section 9 and a second selection right change section 10.

The virtual path connection information notification section 9 notifies another fixed-length cell handling exchange 7 as to which one of the fixed-length cell handling exchanges 7 and 8 has a selection right.

Upon receipt of information with regard to the detection of an inconsistency in the setting of the selection rights from another fixed-length cell exchange 7 as an answer to the notification of the selection right notification section 9, the second selection right change section 10 changes the selection rights of the two fixed-length cell handling exchanges 7 and 8 for the virtual path connections 11, so as to comply with the selection rights specified by another fixed-length cell handling exchange 7.

As a result, by virtue of the fixed-length cell handling exchange 8, the reduction in efficiency of use of the virtual path connection 11 is prevented, and efficient and effective utilization of network resources can be effected.

(b) First Embodiment of the Present Invention

A first embodiment of the present invention will be described with reference to the accompanying drawings.

Figure 5:
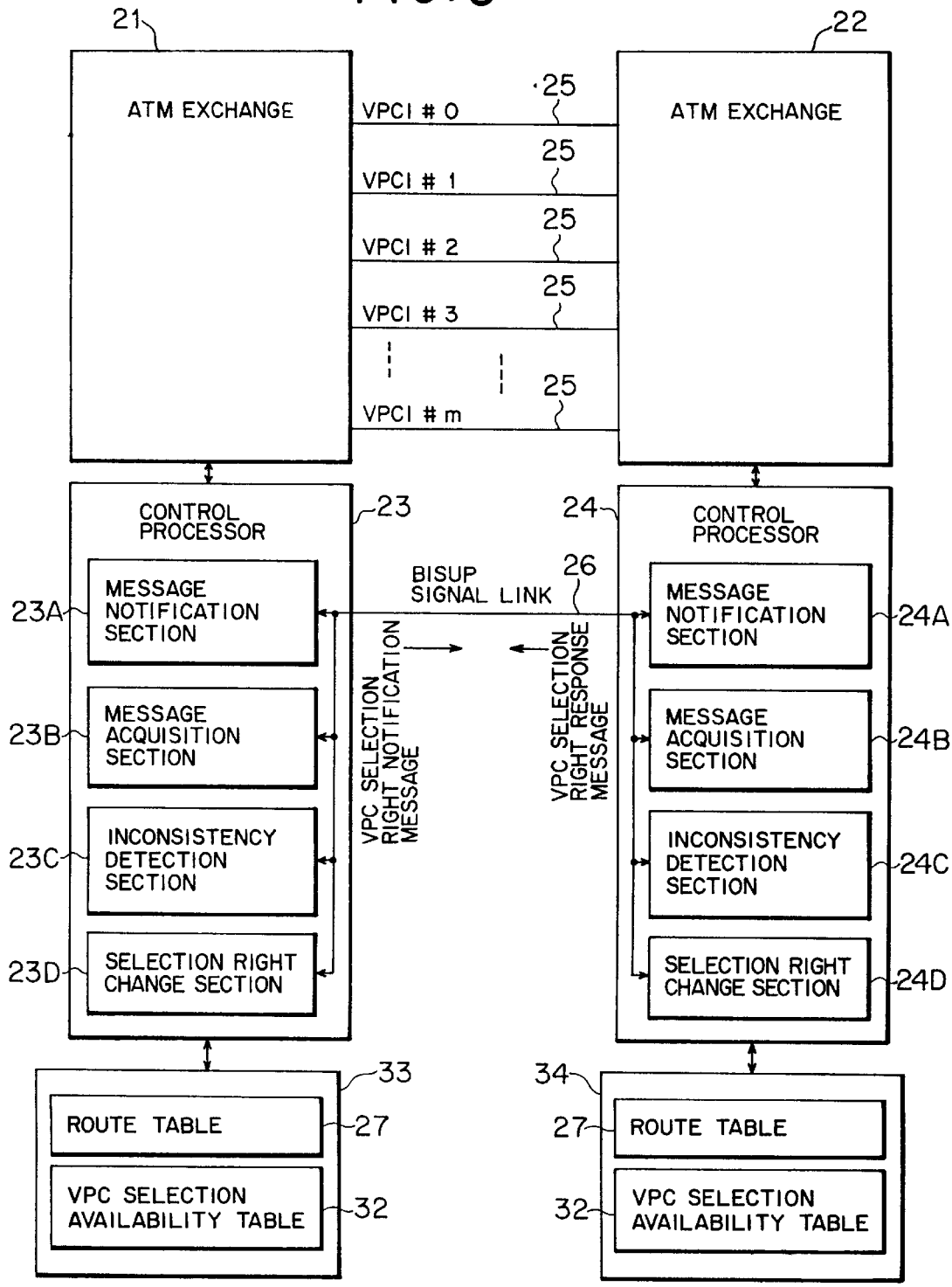
FIG. 5 is a block diagram showing the configuration of a fixed-length cell handling exchange according to a first embodiment of the present invention.

FIG. 5 is a block diagram showing a first embodiment of the present invention. In FIG. 5, reference numerals 21 and 22 designate ATM exchanges that serve as fixed-length cell handling exchanges, and a virtual pass connection selection right checking method of the first embodiment is applied to these ATM exchanges. A plurality of virtual path connections (VPCs: Virtual Path Connections) 25 are provided between these ATM exchanges 21 and 22.

The ATM exchange (a second fixed-length cell handling exchange) 21 and the ATM exchange (a first fixed-length cell handling exchange) 22 shown in FIG. 5 are adjacent to each other and constitute a broadband ISDN (B-ISDN). The plurality of VPCs 25 [(m+1) VPCs in the present embodiment] are assigned #0 to #n as virtual path connection identifiers (VPCI), respectively.

The ATM exchanges 21 and 22 adopt BISUP (B-ISDN User's Part) defined by ITU-T recommendations as an interexchange signal scheme for offering SVC (Switched Virtual Connection) services.

According to BISUP, each of the VPCs 25 is defined so as to be selected by only one of the ATM exchanges 21 and 22. In contrast, in the first embodiment, the selection rights of the ATM exchanges 21 and 22 for the VPC 25 are arbitrarily set according to the agreement between the ATM exchanges 21 and 22 such that their selection rights do not interfere with each other.

The ATM exchanges 21 and 22 are provided with control processors 23 and 24 for checking and correcting the selection rights for the VPCs 25. These control processors 23 and 24 are connected to memory devices 33 and 34, respectively.

These memory devices 33 and 34 hold data which are necessary for the control processors 23 and 24 to set or check the selection rights. Each of the memory devices 33 and 34 is provided with a route table 27 and a VPC selection right availability table 32.

Figure 6:
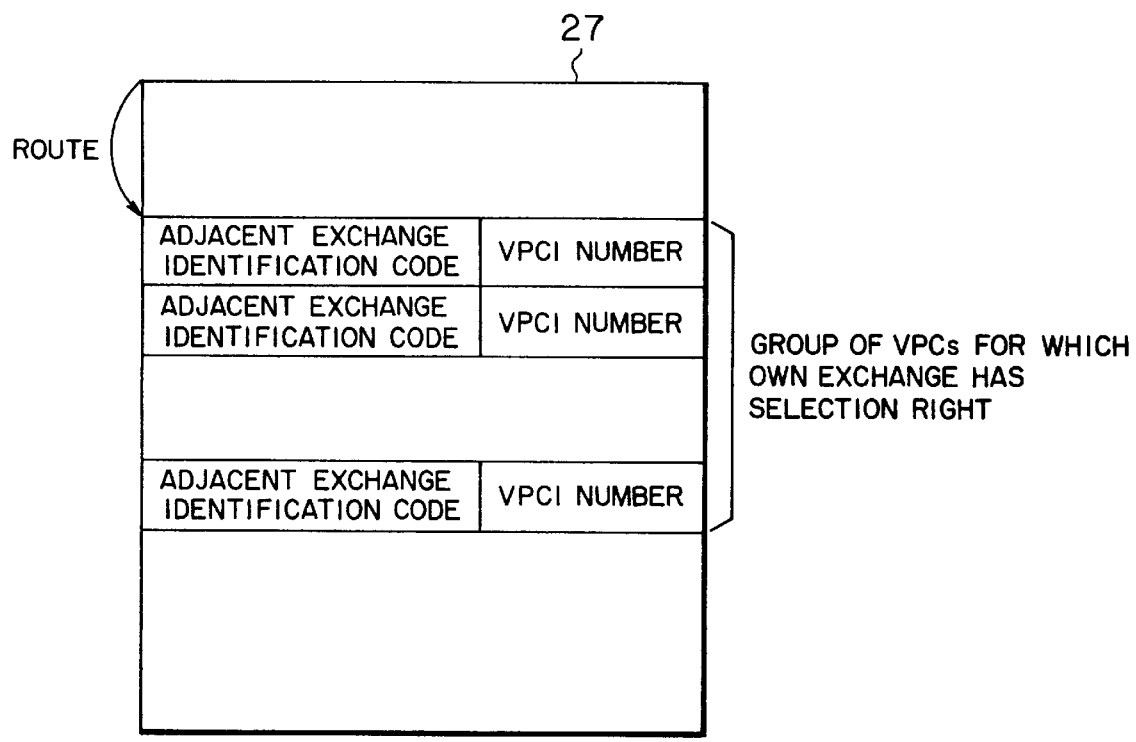
FIG. 6 is a diagram for explaining the configuration of a route table.

The route table 27 is referred to when a VPC selection right notification message is sent, and holds information (or routes) regarding the VPCs 25 for which the selection rights of each ATM exchange are set. As shown in FIG. 6, of information items regarding all the VPCs 25 provided between the adjacent exchanges, information items regarding the VPCs 25 for which the selection rights of the current exchange are set, are registered in the route table 27 as identifiers (VPCI) so as to correspond to codes (adjacent exchange identification codes) for identifying adjacent exchanges (i.e., partner exchanges).

Figure 23:
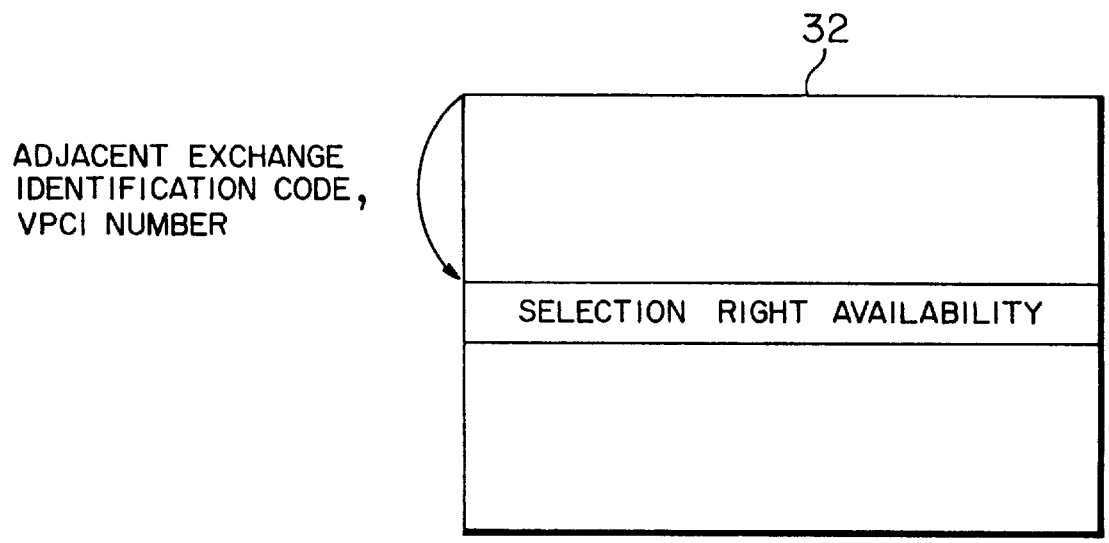
FIG. 23 is a diagram for explaining the configuration of a VPC selection right availability table.

The VPC selection right availability table 32 is referred to when the VPC selection right notification message is received. The VPC selection right availability table 32 shows whether or not the exchange itself has a selection right with respect to each of the VPCs 25. For example, as shown in FIG. 23, selection right availability information as to whether or not the exchange itself (or the ATM exchange 22) has a selection right for the VPC 25, is registered in the VPC selection right availability table 32 so as to correspond to the adjacent exchange identification code and the identifier VPCI of that VPC 25.

When call/connection is established between the ATM exchanges 21 and 22, one of the VPCs 25 for which the selection rights of the ATM exchanges 21 and 22 are set, is selected. For example, if the VPCs 25 for which the selection rights of the ATM exchange 21 are set are all used, selection of the VPC 25 is left to the other ATM exchange 22. If the ATM exchanges 21 and 22 are required to establish call/connection individually at the same time, they are set so as to avoid selecting an identical VPC 25.

As shown in FIG. 5, call/connection is established between the ATM exchanges 21 and 22 by exchanging data which is called a message between the control processors 23 and 24 through a signal line 26.

Figure 7:
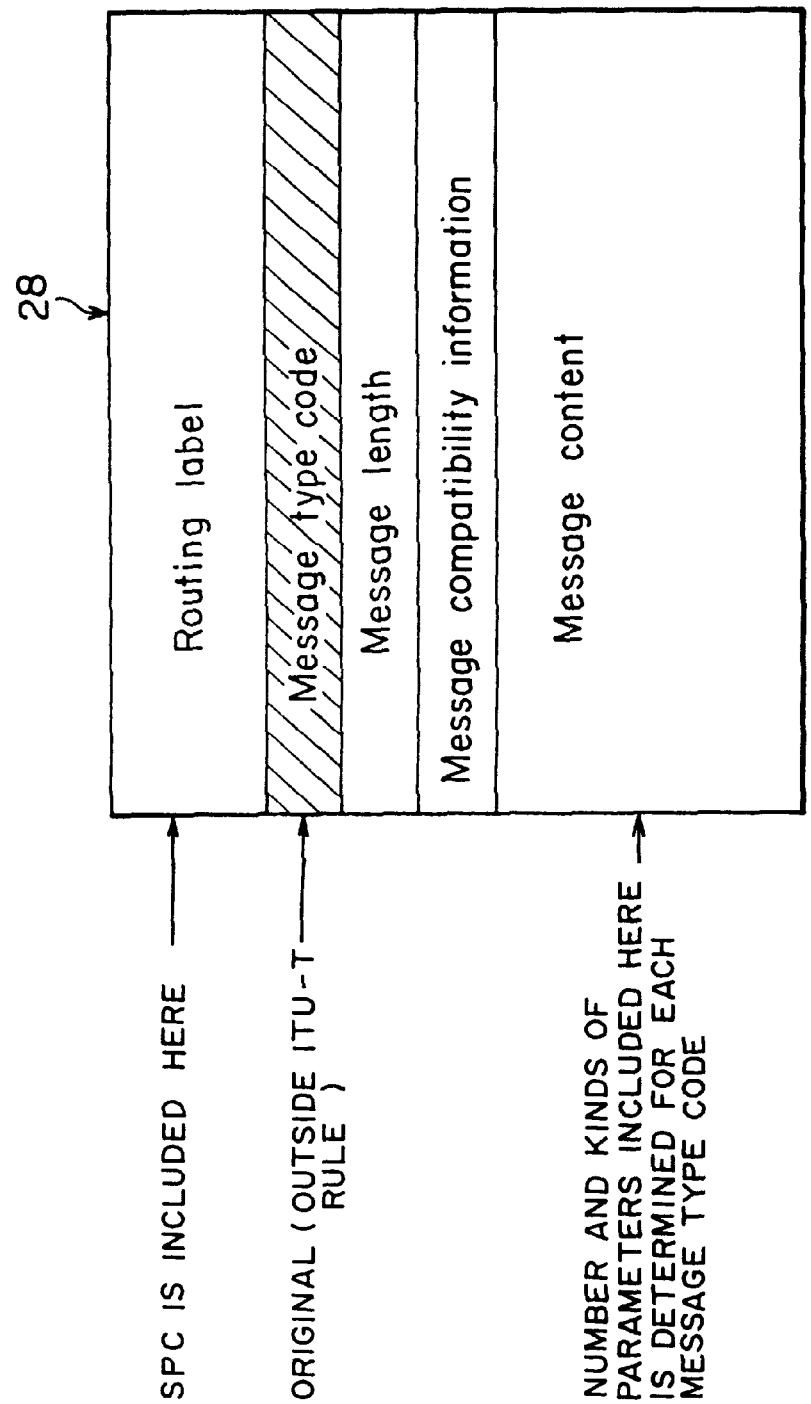
FIG. 7 is a diagram showing the format of a message.

For instance, the message to be exchanged between the control processors 23 and 24 has a structure as shown in FIG. 7. In short, a message 28 shown in FIG. 7 includes various parameters (see; e.g., reference numerals 29 and 30 shown in FIGS. 8 and 9), thereby constituting message information to notify various information items.

As illustrated in FIG. 5, the control processor 23 provided for the ATM exchange 21 is comprised of a message notification section 23A, a message acquisition section 23B, an inconsistency detection section 23C, and a selection right change section 23D. These features can be implemented via; e.g., software.

The control processor 24 provided for the ATM exchange 22 is comprised of a message notification section 24A, a message acquisition section 24B, an inconsistency section 24C, and a selection right change section 24D which are similar to those of the control processor 23 (see reference numerals 23A to 23D). These features can be also implemented via; e.g., software.

The features of constituent elements of the control processors 23 and 24 will be described hereinbelow, provided that the ATM exchange 21 is a sender of a VPC selection right notification message, and that the ATM exchange 22 is a receiver of the thus-sent VPC selection right notification message.

More specifically, the features of the constituent elements of the ATM exchanges 21 and 22 of the first embodiment will be described on the assumption that the ATM exchange 21 sends a VPC selection right notification message (first message information), and that the ATM exchange 22 sends back a VPC selection right response message (second message information).

Even if the ATM exchange that is a sender of the VPC selection right notification message and the ATM exchange that is a receiver of the VPC selection right response message are switched to each other, the constant elements of the corresponding control processors 23, 24 have the same functions.

The message notification section 23A of the control processor 23 sends the previously described VPC selection right notification message.

Specifically, the message notification section 23A fetches information regarding a VPCI number which specifies a VPC 25 provided between the ATM exchanges 21 and 22, and information as to whether or not the ATM exchange 21 has a selection right for the VPC 25 corresponding to the VPCI number, from the route table 27. Then, the message notification section 23A generates a parameter 29, shown in FIG. 8, and a message 28 (see FIG. 7) which includes the parameter 29. This message 28 is sent back as the VPC selection right notification message.

In this way, the message notification section 23A serves as a selection right notification section for notifying the ATM exchange 22 as for which of the ATM exchange 21 or 22 has a selection right, for each of the VPCs 25.

The message acquisition section 23B receives a VPC selection right response message which is returned from the message notification section 24A of the control processor 24 as an answer to the notification of the message notification section 23A.

Figure 9:
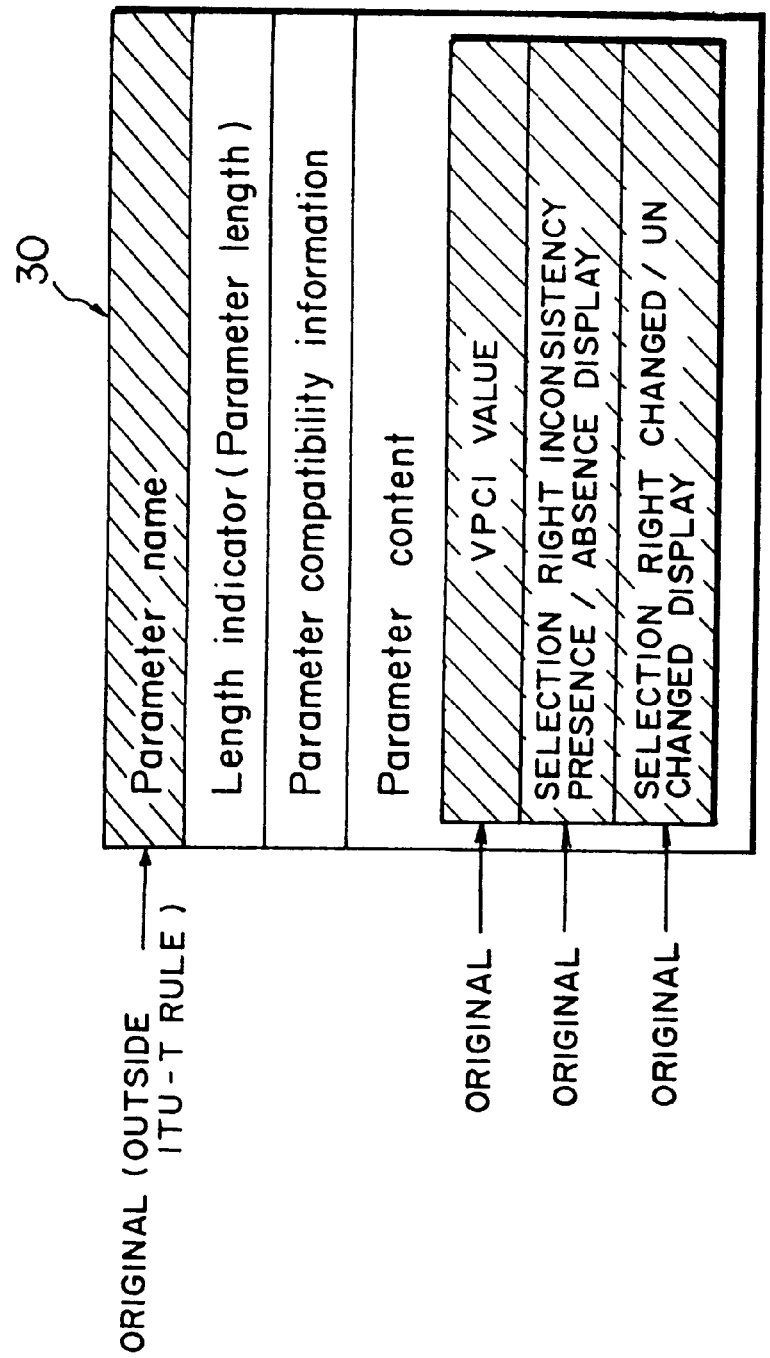
FIG. 9 is a diagram showing the format of a parameter included in a VPC selection right response message.

The VPC selection right response message to be sent from the control processor 24 can be formed into; e.g., the message 28 comprising the parameter 30 shown in FIG. 9.

The inconsistency detection section 23C detects information about detection of an inconsistency in the selection right for a VPC 25, from the contents of the parameter 30 of the VPC selection right response message received from the message acquisition section 23B.

After having received the inconsistency detection information from the inconsistency detection section 23C, if the inconsistency still remains, and if the selection right of the ATM 21 for the VPC 25 is to be changed so as to comply with the selection right specified by the ATM exchange 22, the selection right change section 23D changes the selection right of the ATM exchange 21 for the VPC 25, whereby the inconsistency in the setting of the selection right for the VPC 25 is corrected. In this way, the inconsistency detection section 23C serves as a second selection right change section.

The message acquisition section 24B of the control processor 24 receives the VPC selection right notification message 28 from the message notification section 23A of the control processor 23. Further, the message acquisition section 24B acquires a VPCI number which is identification information (virtual path connection identifier information) of the VPC 25 for which the selection right of the ATM exchange 21 is set. In short, the message acquisition section 24B serves as a virtual path connection information acquisition section.

Based on the VPC selection right availability table 32 of the memory 34, the inconsistency detection section 24C compares the VPCI number specifying the VPC 25 for which the selection right of the ATM exchange 22 is set, with the VPCI number acquired by the message acquisition section 24B in order to detect whether or not an inconsistency is present in the setting of the selection rights for that VPC 25.

For example, where both ATM exchanges 21 and 22 have selection rights for a certain VPC 25, or where neither the ATM exchange 21 nor the ATM exchange 22 has a selection right for a certain VPC 25, the inconsistency detection section 24C detects that an inconsistency is present in the setting of the selection right for the VPC 25.

If the inconsistency detection 24C has detected that an inconsistency is present in the setting of the selection right for the VPC 25, and if the selection right of the ATM exchange 22 for the VPC 25 is to be changed so as to comply with the selection right specified by the corresponding (or the other) ATM exchange 21, the selection right change section 24D corrects the inconsistency in the setting of the selection right for the VPC 25, by changing the selection right of the ATM exchange 22 for that VPC 25. In this way, the selection right change section 24D acts as a first selection right change section.

The message notification section 24A sets the following two kinds of information in the parameter 30 (see FIG. 9). The first kinds of information is information indicating the result of detection by the inconsistency detection section 24C regarding a presence/absence of an inconsistency in the setting of the selection rights for the VPCs 25 provided between the ATM exchanges 21 and 22 (a "selection right normally set" or "selection right inconsistently set" is set as a display as to whether the selection rights are consistent or inconsistent). The second kind of information is selection right changed/unchanged information as to whether or not the selection right change section 24D has changed the selection right for the VPCs 25 (a "selection right unchanged" or "selection right changed" is set as a display as to whether the selection right has been changed or unchanged). The VPC selection right response message 28 comprising this parameter 30 is sent to the control processor 23 provided for the ATM exchange 21.

The format of the message 28, such as the VPC selection right notification message sent by the message notification section 23A and the VPC selection right response message returned from the message notification section 24A, will be described in detail with reference to FIG. 7.

As shown in FIG. 7, the message 28 is comprised of a routing label, a message type code, message length, message compatibility information, and message contents.

The routing label stores SPC (Signaling Point Code) numbers which is an identification code for an exchange.

The message type code comprises a value showing the type of the message. Particularly, in the present embodiment, original codes which are not defined by ITU-T recommendations are used in showing that the message is either a VPC selection right notification message or a VPC selection right response message.

An identical message type code (i.e., a message identifier) can be used for the VPC selection right notification message 28 including the previously-described parameter 29 and the VPC selection right notification message 28 including the parameter 30. In this case, these two types of message can be identified from each other by means of the promoter included in the message content portion which will be described later.

The message contents store parameters which vary with messages. For instance, the VPC selection right notification message includes the parameter 29 shown in FIG. 8, and the VPC selection right response message includes the parameter 30 shown in FIG. 9.

According to the requirements of BISUP, each message includes one or more information items which are called parameters. The number of and type of parameter to be stored are uniquely determined according to the message type codes.

The format of the parameters 29 and 30 of the VPC selection right notification message 28 including the parameter 29 and the VPC selection right information message 28 including the parameter 30 will be described in detail with reference to FIGS. 8 and 9.

Each of these parameters 29 and 30 is comprised of a parameter name, a parameter length, parameter compatibility information, and parameter contents.

The parameter name stores a value which indicates that the corresponding parameter is to be included in either the VPC selection right notification message or the VPC selection right response message. Original parameter names which are not defined by ITU-T recommendations are used.

The parameter contents include information which varies with the types of message (or depending on whether the message is the VPC selection right notification message or the VPC selection right response message).

Figure 8:
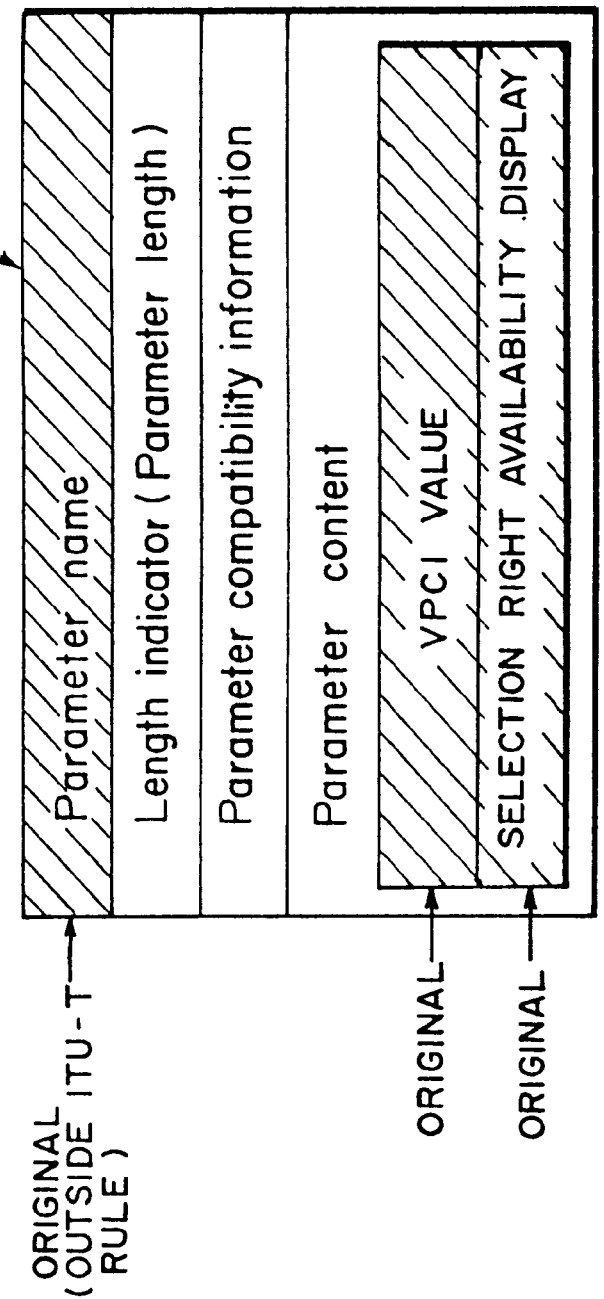
FIG. 8 is a diagram showing the format of a parameter included in a VPC selection right notification message.

As shown in FIG. 8, the parameter 29 included in the VPC selection right notification message 28 is original information which is not defined by ITU-T recommendations. This parameter 29 includes a VPCI value (or VPCI number) for specifying a corresponding VPC 25 and a selection right availability display (or selection right availability information) showing which of the ATM exchange 21 or 22 has a selection right for that VPC 25. The inconsistency detection section 24C of the previously-described control processor 24 detects the information.

As shown in FIG. 9, the parameter 30 to be included in the VPC selection right response message 28 is original information which is not defined by ITU-T recommendations. The parameter 30 is comprised of a VPCI value for specifying a corresponding VPC 25, an inconsistency presence/absence display (or inconsistency presence/absence information) which is the result of determination as to whether the selection right for the VPC 25 is inconsistent or consistent), and a changed/unchanged right display (or changed/unchanged information) as to whether or the selection right for the VPC 25 has been changed. These information items are detected by the inconsistency detection section 23C of the previously-described control processor 23.

With the aforementioned configuration, the operations of the ATM exchanges 21 and 22 of the first embodiment will be described hereinbelow, referring to FIG. 5 and FIGS. 10 to 13.

Figure 10:
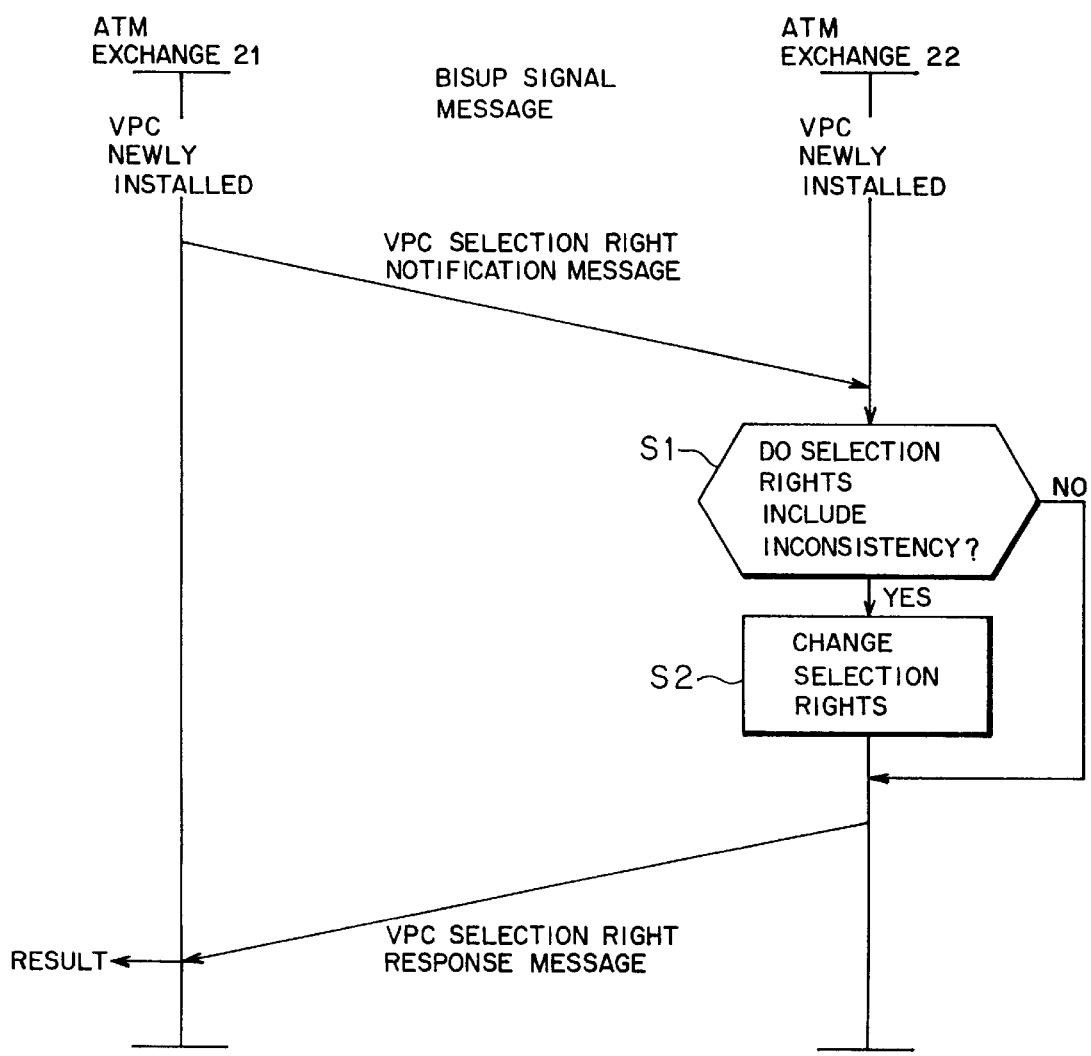
FIG. 10 is a schematic diagram for explaining the operation of an ATM exchange according to the first embodiment of the present invention.

For example, as shown in FIG. 10, when a VPC 25 is newly or additionally provided between the ATM exchanges 21 and 22, and the selection rights for the VPC 25 are inconsistent before the thus-newly or additionally provided VPC 25 becomes available for call/connection, the selection right of the ATM exchange 22 for the VPC 25 is changed so as to comply with the selection right specified by the ATM exchange 21.

More specifically, when the selection rights of the ATM exchanges 21 and 22 for the VPC 25 are checked and corrected, the message notification section 23A of the control processor 23 provided for the ATM exchange 21 sends the message acquisition section 24B of the control processor 24 provided for the ATM exchange 22, the VPC selection right notification message 28 (see FIG. 7) as to which of the ATM exchange 21 or 22 has a selection right for the VPC 25, via a signal line 26.

When the VPC selection right notification message 28 is received by the message acquisition section 24B of the control processor 24 of the ATM exchange 22, the inconsistency detection section 24C detects a presence or absence of an inconsistency in the setting of the selection rights for the VPC 251 (in step S1).

If it is determined by the inconsistency detection section 24C that the selection rights for the newly or additionally provided VPC 25 are consistent (processing proceeds to NO from step S1), the VPC selection right response message 28 including the parameter 30 (see FIG. 9) is returned from the message notification section 24A to the message acquisition section 23B of the control processor 23 provided for the ATM exchange 21 via the signal line 26. In this case, the parameter 30 is comprised of the inconsistency absence information indicating that no inconsistency is present in the setting of the selection rights for the VPC 25, and the selection right unchanged information as to the fact that the selection right change section 24D has not changed the selection rights for the VPC 25.

If it is determined by the inconsistency detection section 24C that an inconsistency is present in the setting of the selection rights (processing proceeds to YES from step S1), the selection right change section 24D changes the selection right of the ATM exchange 22 for the VPC 25, so as to comply with the selection right specified by the ATM exchange 21 (step S2).

Subsequently, the message notification section 24A of the control processor 24 returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency presence information as to the fact that an inconsistency is present in the setting of the selection rights for the VPC 25, and the selection right changed information as to the fact that selection right change section 24D has changed the selection right for the VPC 25.

Figure 12:
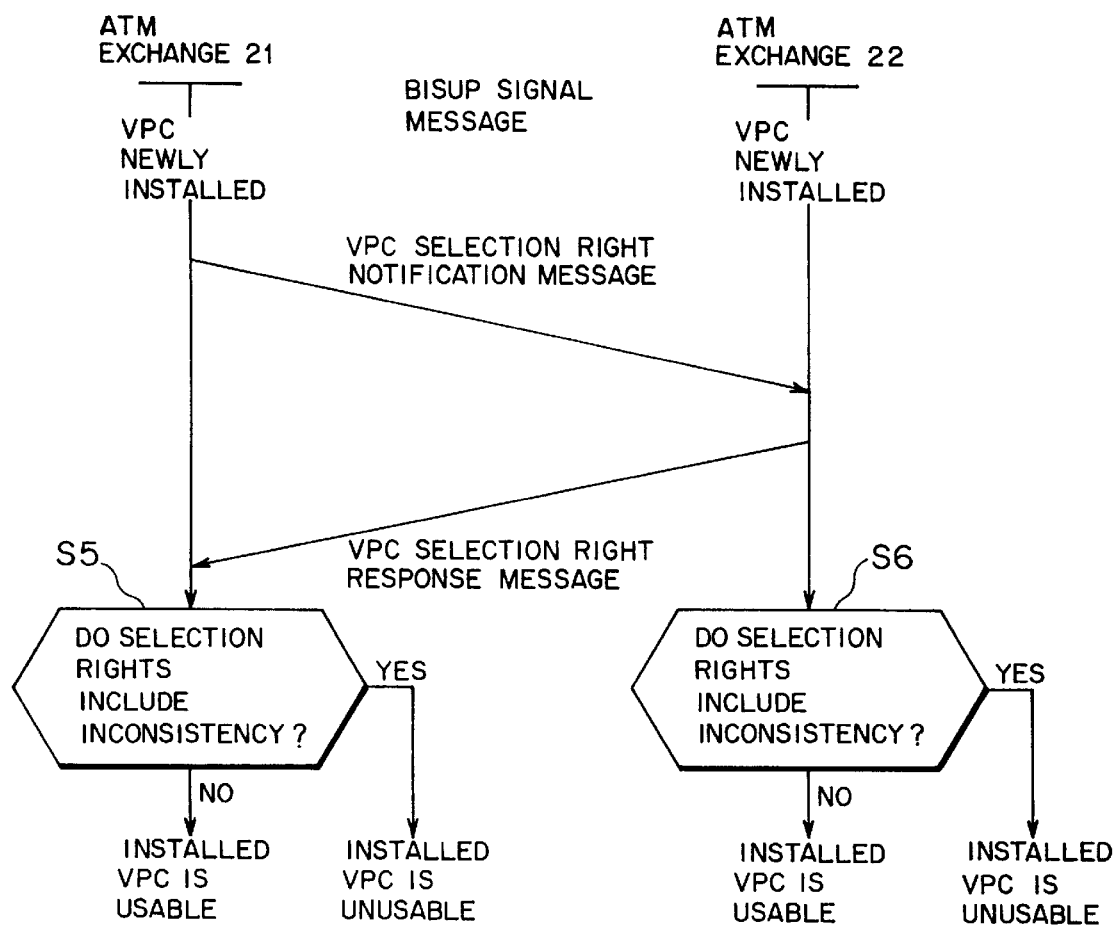
FIG. 12 is a schematic diagram for explaining the operation of the ATM exchange according to the first embodiment of the present invention.

Also, the following operation may be employed. As shown in FIG. 12, for example, when a VPC 25 is newly or additionally provided between the ATM exchanges 21 and 22, it is determined whether or not an inconsistency is present in the setting of the selection rights for the VPC 25, before the thus-newly or additionally provided VPC 25 becomes available for call/connection. Only when it is determined that no inconsistency is present in the setting of the selection rights for the VPC 25, the VPC 25 is brought into a usable state.

More specifically, the message notification section 23A of the control processor 23 provided for the ATM exchange 21 sends the message acquisition section 24B of the control processor 24 provided for the ATM exchange 22, the VPC selection right notification message 28 (see FIG. 7) as to which of the ATM exchange 21 or 22 has a selection right for the VPC 25, via the signal line 26.

When the VPC selection right notification message 28 is received by the message acquisition section 24B of the control processor 24 of the ATM exchange 22, the inconsistency detection section 24C determines whether or not an inconsistency is present in the setting of the selection rights for the VPC 25 (in step S6).

If it is determined by the inconsistency detection section 24C that no inconsistency is present in the setting of the selection rights for the newly or additionally provided VPC 25, the VPC 25 is made usable for call/connection. In contrast, if it is determined that the setting has an inconsistency, the VPC 25 is made unavailable for call/connection.

If it is determined by the inconsistency detection section 24C that no inconsistency is present in the setting of the selection rights, the message notification section 24A of the control processor 24 returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency absence information as to the fact that no inconsistency is present in the setting of the selection rights for the VPC 25, and the selection right unchanged information as to the fact that the selection right change section 24D has not changed the selection rights for the VPC 25.

If it is determined by the inconsistency detection section 24C that an inconsistency is present in the setting of the selection rights, the message notification section 24A of the control processor 24 returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency presence information as to the fact that an inconsistency is present in the setting of the selection rights for the VPC 25, and the selection right unchanged information as to the fact that the selection right change section 24D has not changed the selection rights for the VPC 25.

Further, when the message acquisition section 23B of the control processor 23 of the ATM exchange 21 has received the VPC selection right response message 28, the inconsistency detection section 23C determines whether or not an inconsistency is present in the setting of the selection rights for the VPC 25 (step S5).

If it is determined by the inconsistency detection section 23C that no inconsistency is present in the setting of the selection rights, the VPC 25 is made usable for call/connection. In contrast, it is determined that the setting includes an inconsistency, the VPC 25 is made unavailable for call/connection.

Figure 11:
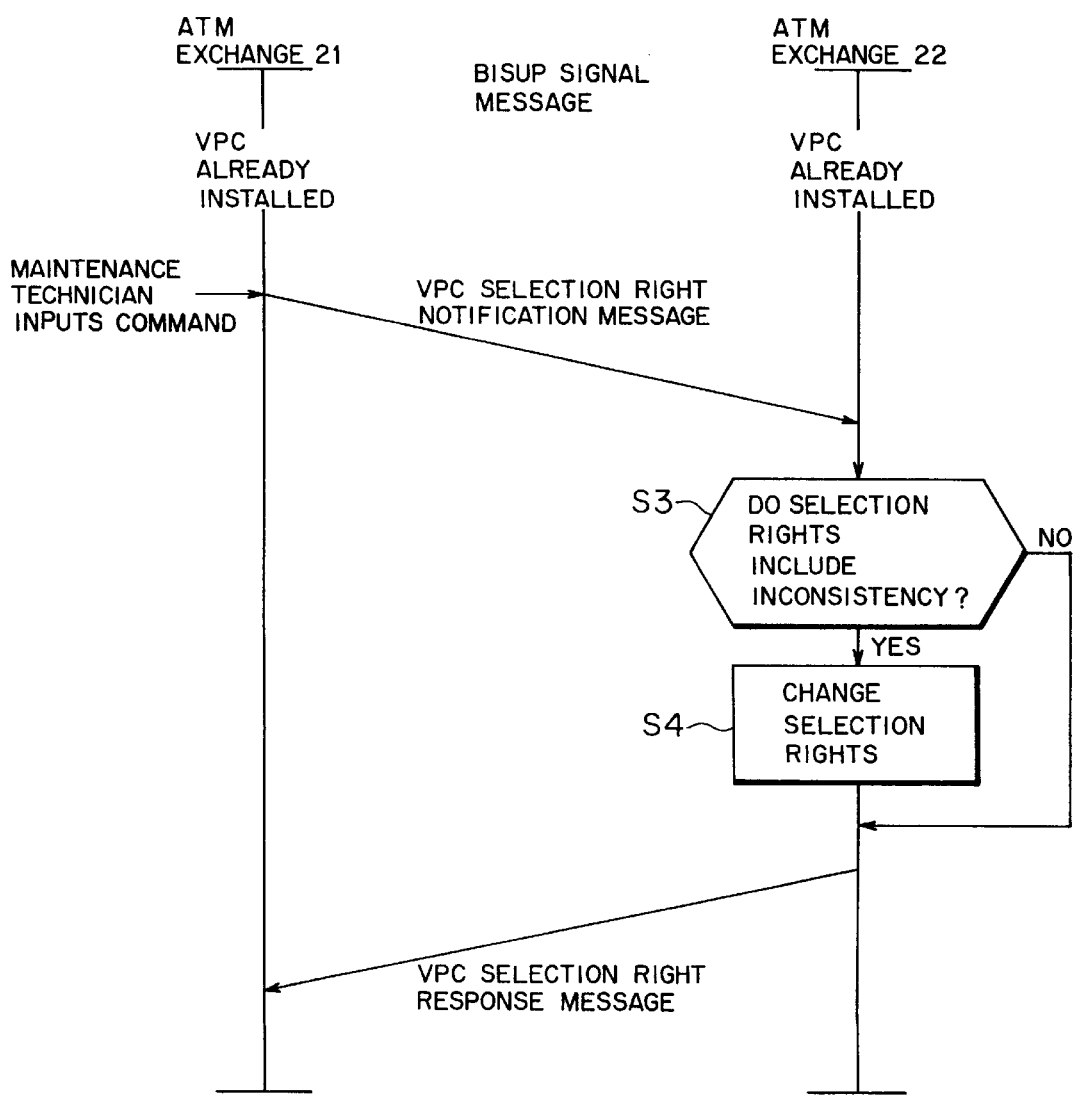
FIG. 11 is a schematic diagram for explaining the operation of the ATM exchange according to the first embodiment of the present invention.

For example, as shown in FIG. 11, even when the VPC 25 is already usable for call/connection, it is checked whether or not an inconsistency is present in the setting of the selection rights for the VPC 25 existing between the ATM exchanges 21 and 22 through exchange of the messages 28 similar to those used in the previous cases. If an inconsistency is present in the setting of the selection rights for the VPC 25, the selection right of the ATM exchange 22 for the VPC 25 can be changed so as to comply with the selection right specified by the ATM exchange 21.

Specifically, when the selection rights of the ATM exchanges 21 and 22 for the VPC 25 which is in service between them are checked and corrected, a maintenance technician inputs; e.g., a command for checking whether or not the selection rights for the existing VPC 25 are inconsistent, to the control processor 23 of the ATM exchange 21. In response to the input of the command, the message notification section 23A sends the message acquisition section 24B of the control processor 24, the VPC selection right notification message 28 (see FIG. 7) as to which of the ATM exchange 21 or 22 has a selection right for the VPC 25, via the signal line 26.

When the message acquisition section 24B of the control processor 24 of the ATM exchange 22 has received the VPC selection right notification message 28, the inconsistency detection section 24C determines whether or not an inconsistency is present in the setting of the selection rights for the VPC 25 (step S3).

If it is determined by the inconsistency detection section 24C that no inconsistency is present in the setting of the selection rights (the processing proceeds to NO from step S3), the message notification section 24A returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency absence information as to the fact that no inconsistency is present in the setting of the selection rights for the VPC 25, and the selection right unchanged information as to the fact that the selection right change section 24D has not changed the selection rights for the VPC 25.

If it is determined by the inconsistency detection section 24C that an inconsistency is present in the setting of the selection rights (the processing proceeds to YES from step S3), the selection right change section 24D changes the selection right of the ATM exchange 22 for the VPC 25, so as to comply with the selection right specified by the ATM exchange 21 (step S4).

Subsequently, the message notification section 24A of the control processor 24 returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency presence information as to the fact that an inconsistency is present in the setting of the selection rights for the VPC 25, and the selection right unchanged information as to the fact that the selection right change section 24D has changed the selection rights for the VPC 25.

Figure 13:
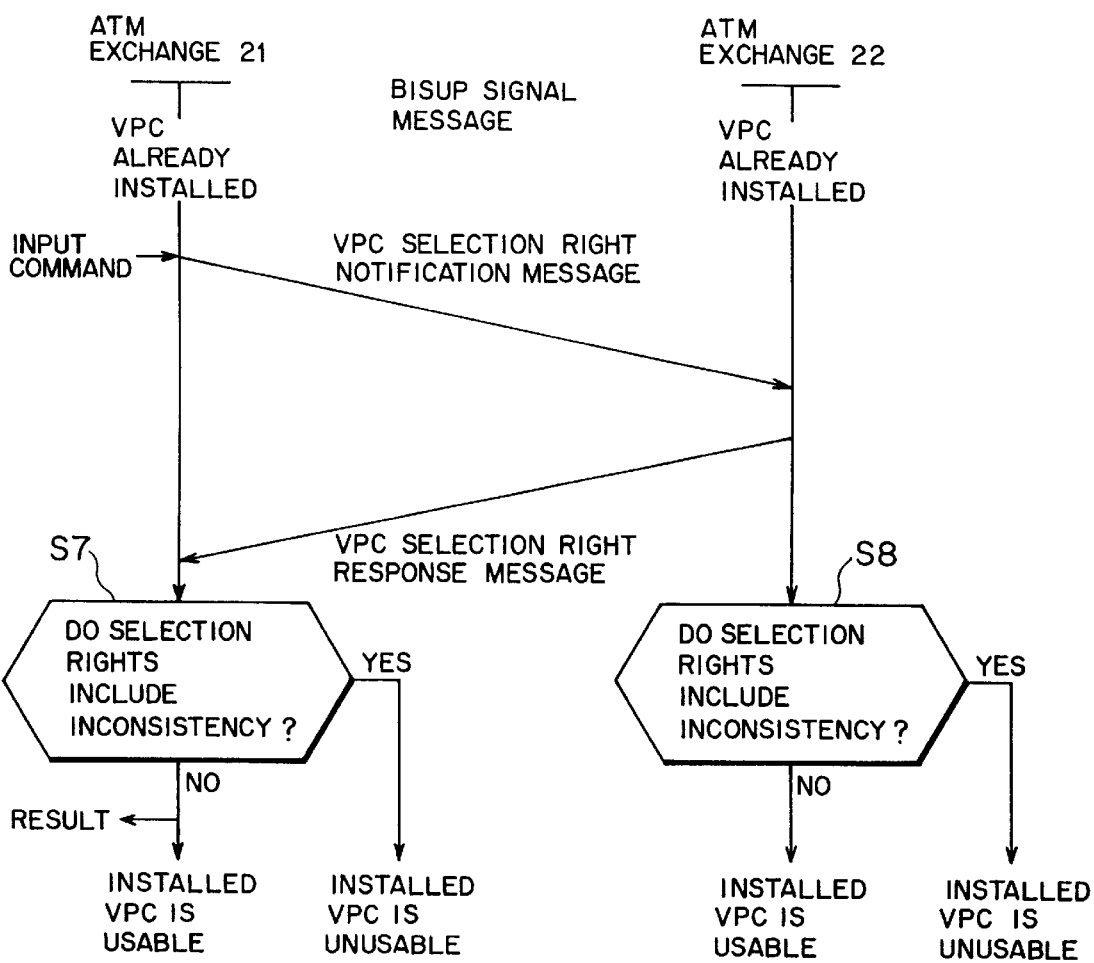
FIG. 13 is a schematic diagram for explaining the operation of the ATM exchange according to the first embodiment of the present invention.

For example, as shown in FIG. 13, even when the VPC 25 existing between the ATM exchanges 21 and 22 are usable for call/connection, it is checked whether or not an inconsistency is present in the setting of the selection rights for this VPC 25. If the setting has been found to have an inconsistency, this VPC 25 is made unavailable for call/connection.

More specifically, if a maintenance technician inputs a command for checking whether or not the selection rights for the existing VPC 25 are consistent, to the control processor 23 of the ATM exchange 21. In response to the input of the command, the message notification section 23A of the control processor 23 sends the message acquisition section 24B of the control processor 24, the VPC selection right notification message 28 as to which of the ATM exchange 21 or 22 has a selection right for the VPC 25, via the signal line 26.

When the message acquisition section 24B of the control processor 24 of the ATM exchange 22 has received the VPC selection right notification message 28, the inconsistency detection section 24C determines whether or not an inconsistency is present in the setting of the selection rights for the VPC 25 (step S8).

If it is determined by the inconsistency detection section 24C that no inconsistency is present in the setting of the selection rights for the existing VPC 25, the VPC 25 are made usable for call/connection. In contrast, if the setting has been determined to have an inconsistency, the VPC 25 is made unavailable for call/connection.

Further, if it is determined by the inconsistency detection section 24C that no inconsistency is present in the setting of the selection rights for the existing VPC 25, the message notification section 24A of the control processor 24 returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency absence information as to the fact that no inconsistency is present in the setting of the selection rights for the VPC 25, and the selection right unchanged information as to the fact that the selection right change section 24D has not changed the selection rights for the VPC 25.

In contrast, if it is determined by the inconsistency detection section 24C that an inconsistency is present in the setting of the selection rights for the existing VPC 25, the message notification section 24A of the control processor 24 returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency presence information as to the fact that an inconsistency is present in the setting of the selection rights for the VPC 25, and the selection right unchanged information as to the fact that the selection right change section 24D has not changed the selection rights for the VPC 25.

When the message acquisition section 23B of the control processor 23 of the ATM exchange 21 has received the VPC selection right response message 28, the inconsistency detection section 23C determines whether or not an inconsistency is present in the setting of the selection rights for the VPC 25 (step S7).

If it is determined by the inconsistency detection section 23C that no inconsistency is present in the setting of the selection rights for the existing VPC 25, the VPC 25 are made usable for call/connection. In contrast, if it is determined that the setting includes an inconsistency, the VPC 25 is made unavailable for call/connection.

As described above, the ATM exchanges 21 and 22 of the first embodiment of the present invention check whether or not an inconsistency is present in the setting of the selection rights of the ATM exchanges 21 and 22 for the VPC 25, using the VPC selection right notification message 28 and the VPC selection right response message 28 which are original messages in compliance with BISUP. If the setting has been found to have an inconsistency, the setting of the selection rights for that VPC is corrected. As a result, the reduction in efficiency of use of the VPC 25 is prevented, and network resources can be efficiently and effectively utilized.

In the first embodiment, an identical message identifier (or an identical message type) is used for the VPC selection right notification message 28 and the VPC selection right response message 28. A message can be easily prepared by changing only the type of parameter, which in turn eliminates needless setting of many types of message.

Further, when the VPC 25 is newly and additionally provided between the ATM exchanges 21 and 22 in the first embodiment, it is checked whether or not an inconsistency is present in the setting of the selection rights for this VPC 25. Only when the setting of the selection rights for that VPC 25 have been found to have no inconsistency, the VPC 25 is made usable. When the VPC 25 existing between the ATM exchanges 21 and 22 is in a state of being usable for call/connection, it is checked whether or not an inconsistency is present in the setting of the selection rights for this VPC 25. If the setting has been found to have an inconsistency, the VPC 25 can be made unavailable for call/connection. As a result, the reduction in efficiency of use of the VPC 25 is prevented, and network resources can be efficiently and effectively utilized.

(c) Second Embodiment of the Present Invention

According to the descriptions of the first embodiment, if the selection rights of the ATM exchanges 21 and 22 for the VPC 25 are inconsistently set, the selection right of the ATM exchange 22 for the VPC 25 is changed so as to comply with the selection right specified by the ATM exchange 21 that sends the VPC selection right notification message 28. A second embodiment will be described for a case where the selection right of the ATM exchange 21 for the VPC 25 is changed so as to comply with the selection right specified by the ATM exchange 22 that receives the VPC selection right notification message 28 (or returns the VPC selection right response message).

Even in the second embodiment, the ATM exchanges 21 and 22 have the control processors 23 and 24 which are the same as those of the first embodiment. The VPC selection right notification message 28 and the VPC selection right response message 28 that are the same as those used in the first embodiment can be also used in checking and correcting the selection rights for the VPC 25.

The second embodiment is different from the first embodiment in that the selection right change section 23D of the control processor 23 provided for the ATM exchange 21 functions, and that the selection change section 24D of the control processor 24 provided for the ATM exchange 22. In other respects, these embodiments are basically identical to each other.

The operations of the ATM exchanges 21 and 22 of the second embodiment having the above-described configuration will now be described referring to FIG. 5 and FIGS. 14 and 15.

Figure 14:
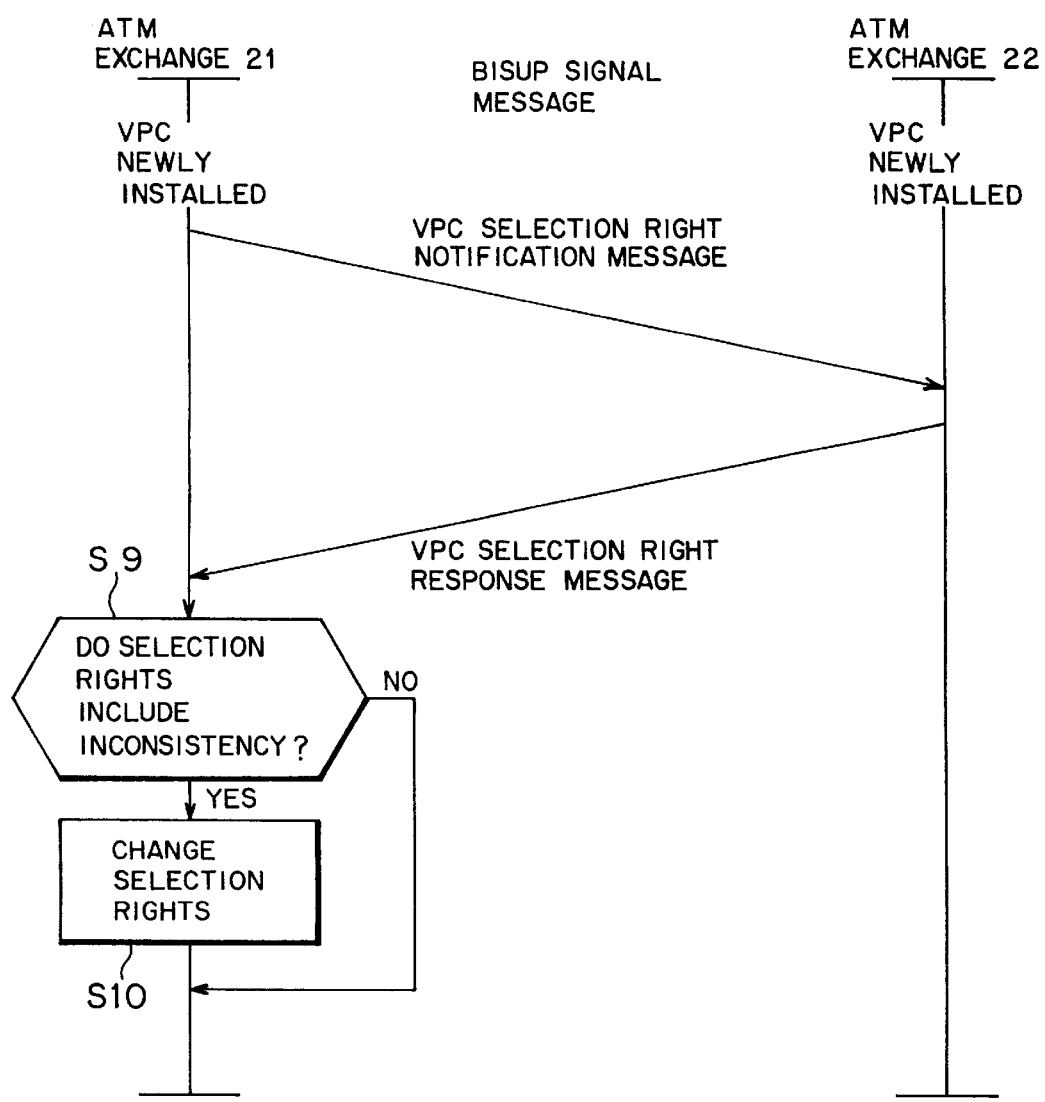
FIG. 14 is a schematic diagram for explaining the operation of an ATM exchange according to a second embodiment of the present invention.

For example, as shown in FIG. 14, when a VPC 25 is newly or additionally provided between the ATM exchanges 21 and 22, and an inconsistency is present in the setting of the selection rights for the VPC 25 before the thus-newly or additionally provided VPC 25 becomes available for call/connection, the selection right of the ATM exchange 21 for the VPC 25 is changed so as to comply with the selection right specified by the ATM exchange 22.

Specifically, the message notification section 23A of the control processor 23 provided for the ATM exchange 21 sends the message acquisition section 24B of the control processor 24 provided for the ATM exchange 22, the VPC selection right notification message 28 (see FIG. 7) as to which of the ATM exchange 21 or 22 has a selection right for the VPC 25, via the signal line 26.

When the message acquisition section 24B of the control processor 24 of the ATM exchange 22 has received the VPC selection right notification message 28, the inconsistency detection section 24C determines whether or not an inconsistency is present in the setting of the selection rights for the VPC 25.

If it is determined by the inconsistency detection section 24C that no inconsistency is present in the setting of the selection rights for the thus-newly or additionally provided VPC 25, the message notification section 24A returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency absence information as to the fact that no inconsistency is present in the setting of the selection rights for the VPC 25, and the selection right unchanged information as to the fact that the selection right change section 24D has not changed the selection rights for the VPC 25.

In contrast, if it is determined by the inconsistency detection section 24C that an inconsistency is present in the setting of the selection rights for the thus-newly or additionally provided VPC 25, the message notification section 24A returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency presence information as to the fact that an inconsistency is present in the setting of the selection rights for the VPC 25, and the selection right unchanged information as to the fact that the selection right change section 24D has not changed the selection rights for the VPC 25.

When the message acquisition section 23B of the control processor 23 of the ATM exchange 22 has received the VPC selection right response message 28, the inconsistency detection section 23C determines whether or not an inconsistency is present in the setting of the selection rights for the VPC 25.

When the inconsistency absence information showing that no inconsistency is present in the setting of the selection rights for the VPC 25, and the selection right unchanged information showing that the selection right change section 24D has not changed the selection rights for the VPC 25, are detected from the VPC selection response message 28, it is determined by the inconsistency detection section 23C that no inconsistency is present in the setting of the selection rights for the VPC 25. In this case, the selection right change section 23D does not change the selection rights for the VPC 25 (the processing proceeds to NO from step S9).

When the inconsistency presence information showing that an inconsistency is present in the setting of the selection rights for the VPC 25, and the selection right unchanged information showing that the selection right change section 24D has not changed the selection rights for the VPC 25, are detected from the VPC selection response message 28, the inconsistency detection section 23C determines that an inconsistency is present in the setting of the selection rights for the VPC 25. In this case, the selection right change section 23D changes the selection right of the ATM exchange 21 for the VPC 25, so as to comply with the selection right specified by the ATM exchange 22 (the processing proceeds from YES in step S9 to step S10).

Even in the second embodiment, as has been described in the first embodiment with reference to FIG. 12, when a VPC 25 is newly or additionally provided between the ATM exchanges 21 and 22, it is checked whether or not an inconsistency is present in the setting of the selection rights for the VPC 25 before the thus-newly or additionally provided VPC 25 becomes available for call/connection. Only when no inconsistency is present in the setting of the selection rights for the VPC 25, the VPC 25 can be made usable.

Figure 15:
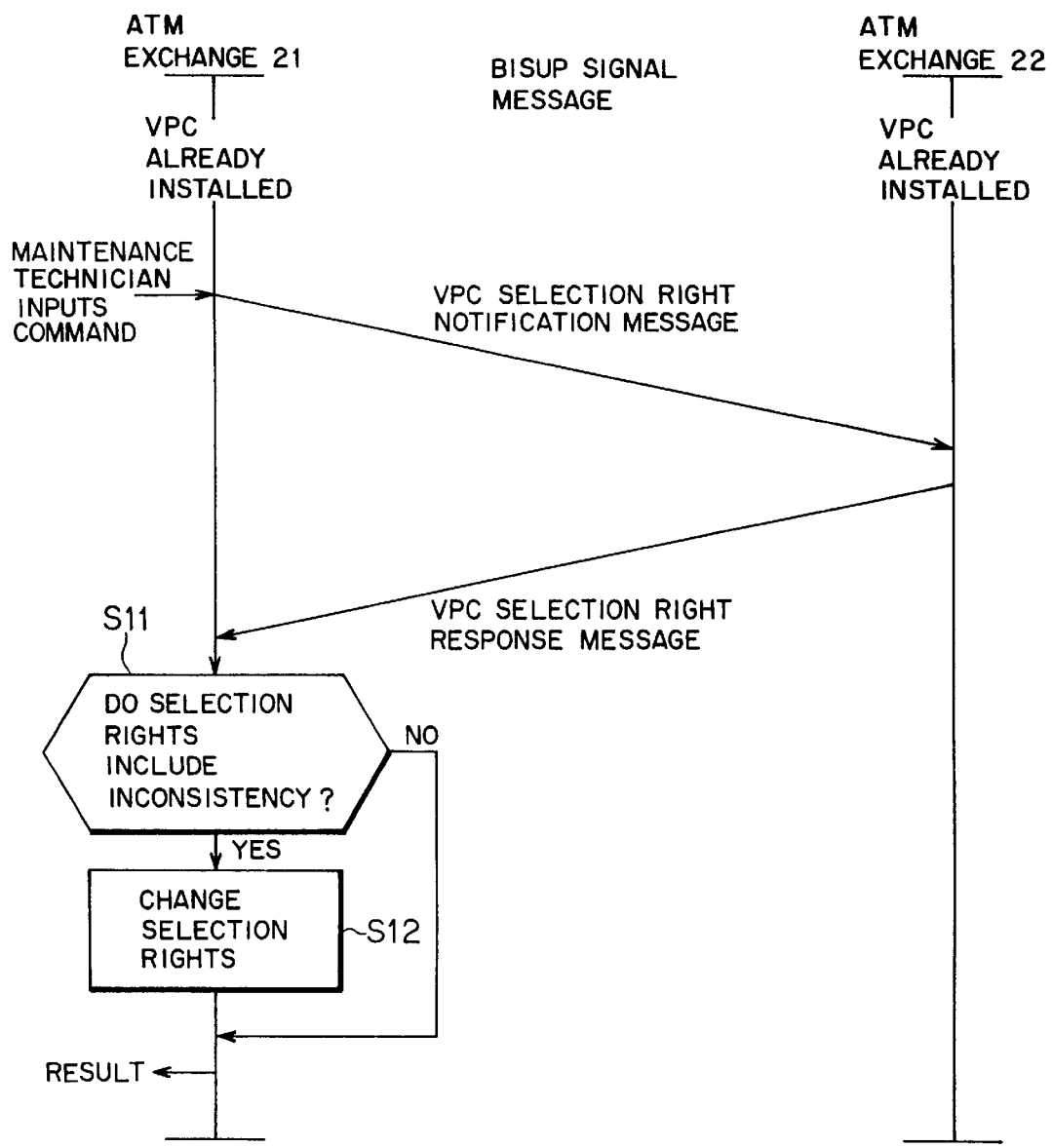
FIG. 15 is a schematic diagram for explaining the operation of the ATM exchange according to the second embodiment of the present invention.
Figure 16:
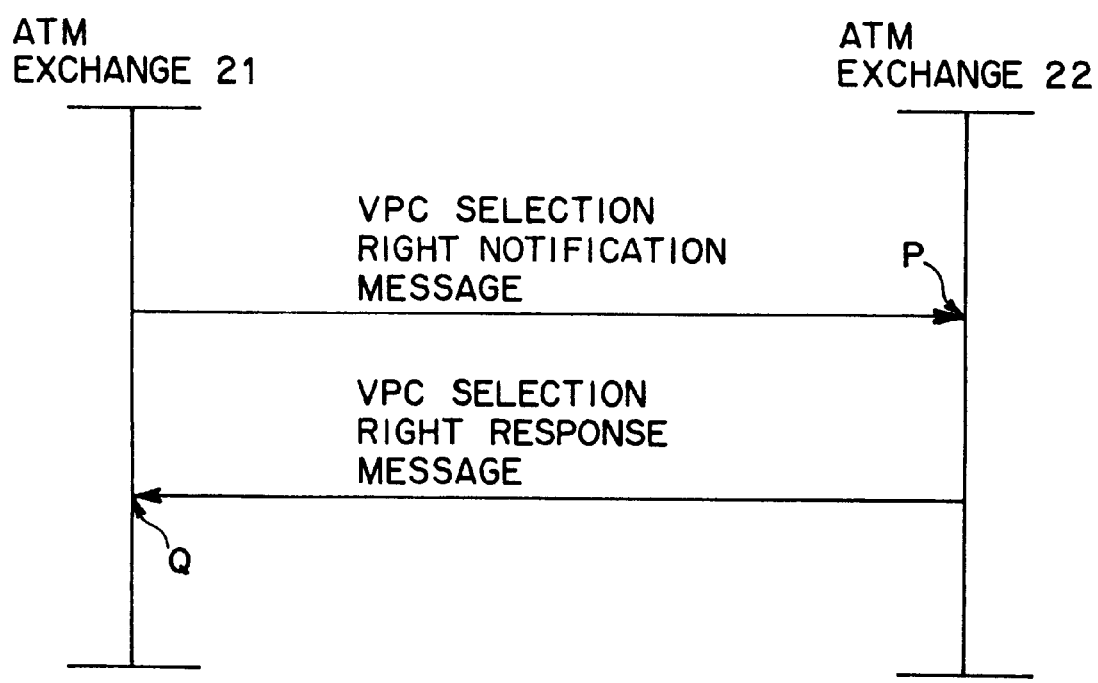
FIG. 16 is a diagram showing a signal sequence used between ATM exchanges according to a third embodiment of the present invention.

For example, as shown in FIG. 15, even when the VPC 25 existing between the ATM exchanges 21 and 22 is already usable for call/connection, it is checked whether or not an inconsistency is present in the setting of the selection rights for the VPC 25 through exchange of the messages 28 similar to those used in the previous embodiment. If an inconsistency is present in the setting of the selection rights for the VPC 25, the selection right of the ATM exchange 21 for the VPC 25 can be changed so as to comply with the selection right specified by the ATM exchange 22.

Specifically, when the selection rights of the ATM exchanges 21 and 22 for a VPC 25 which is in service between them are checked and corrected, a maintenance technician inputs; e.g., a command for checking whether or not the selection rights for the existing VPC 25 are inconsistent, to the control processor 23 of the ATM exchange 21. In response to the input of the command, the message notification section 23A sends the message acquisition section 24B of the control processor 24, the VPC selection right notification message 28 (see FIG. 7) as to which of the ATM exchange 21 or 22 has a selection right for the VPC 25, via the signal line 26.

When the message acquisition section 24B of the control processor 24 of the ATM exchange 22 has received the VPC selection right notification message 28, the inconsistency detection section 24C determines whether or not an inconsistency is present in the setting of the selection rights for the VPC 25.

If it is determined by the inconsistency detection section 24C that no inconsistency is present in the setting of the selection rights, the message notification section 24A returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency absence information as to the fact that no inconsistency is present in the setting of the selection rights for the VPC 25, and the selection right unchanged information as to the fact that the selection right change section 24D has not changed the selection rights for the VPC 25.

If it is determined by the inconsistency detection section 24C that an inconsistency is present in the setting of the selection rights, the message notification section 24A returns the VPC selection right response message 28 including the parameter 30 (see FIG. 9) to the message acquisition section 23B of the control processor 23 provided for the ATM exchange 21 via the signal line 26. At this time, the parameter 30 is comprised of the inconsistency presence information as to the fact that an inconsistency is present in the setting of the selection rights for the VPC 25, and the selection right unchanged information as to the fact that the selection right change section 24D has not changed the selection rights for the VPC 25.

When the message acquisition section 23B of the control processor 23 of the ATM exchange 21 has received the VPC selection right notification message 28, the inconsistency detection section 23C determines whether or not an inconsistency is present in the setting of the selection rights for the VPC 25.

When the inconsistency absence information showing that no inconsistency is present in the setting of the selection rights for the VPC 25, and the selection right unchanged information showing that the selection right change section 24D has not changed the selection rights for the VPC 25, are detected from the VPC selection response message 28, the inconsistency detection section 23C determines that no inconsistency is present in the setting of the selection rights for the VPC 25. In this case, the selection right change section 23D does not change the selection rights for the VPC 25 (the processing proceeds to NO from step S11).

When the information showing that an inconsistency is present in the setting of the selection rights for the VPC 25, and the selection right unchanged information showing that the selection right change section 24D has not changed the selection rights for the VPC 25, are detected from the VPC selection response message 28, the inconsistency detection section 23C determines that an inconsistency if present in the setting of the selection rights for the VPC 25. In this case, the selection right change section 23D changes the selection right of the ATM exchange 21 for the VPC 25, so as to comply with the selection right specified by the ATM exchange 22 (the processing proceeds from YES in step S11 to step S12).

Even in the present embodiment, as has been described in the first embodiment with reference to FIG. 13, when the VPC 25 existing between the ATM exchanges 21 and 22 is already usable for call/connection, it is checked whether or not an inconsistency is present in the setting of the selection rights for the VPC 25. If the setting of the selection rights for the VPC 25 has been found to have an inconsistency, it is also possible to make this VPC 25 unavailable for call/connection.

As described above, the ATM exchanges 21 and 22 of the second embodiment of the present invention also check whether or not an inconsistency is present in the setting of the selection rights of the ATM exchanges 21 and 22 for the VPC 25, using the VPC selection right notification message 28 and the VPC selection right response message 28 which are original messages in compliance with BISUP. If the setting has been found to have an inconsistency, the setting of the selection rights for that VPC 25 is corrected. As a result, it is also possible to obtain the same effects as those obtained by the ATM exchanges 21 and 22 of the first embodiment.

(d) Third Embodiment of the Present Invention

FIGS. 16 through 20 are illustrate for describing a third embodiment of the present invention. The third embodiment is different from the first and second embodiments in that if the selection rights of the ATM exchanges 21 and 22 a VPC 25 are inconsistently set, the selection rights of the ATM exchanges 21 and 22 for the VPC 25 are changed so as to comply with the selection right specified by either of the ATM exchanges 21 and 22. In other respects, the present embodiment is basically identical to the previous embodiments.

More specifically, in the present embodiment, the right of one ATM exchange to select a VPC 25 is corrected so as to comply with the right of the other ATM exchange having a larger or smaller SPC number, according to the agreement between the ATM exchanges 21 and 22.

Even in the third embodiment, the ATM exchanges 21 and 22 have the control processors 23 and 24 which are the same as those of the first and second embodiments. The VPC selection right notification message 28 and the VPC selection right response message 28 that are the same as those used in the previous embodiments can be also used in checking and correcting the selection rights for the VPC 25.

With the foregoing arrangement, as shown in; e.g., FIGS. 10 and 14, when a VPC 25 is newly or additionally provided between the ATM exchanges 21 and 22, the thus-newly or additionally provided VPC 25 becomes available for call/connection in a front stage. If an inconsistency if present in the setting of the selection rights for the VPC 25, the ATM exchanges 21 and 22 of the third embodiment change the setting of one of the selection rights of the ATM exchanges 21 and 22 for the VPC 25, so as to comply with the selection right specified by the other ATM exchange based on the SPC numbers assigned to the ATM exchanges 21 and 22.

More specifically, as in the case of the first and second embodiments, when the VPC selection right notification message 28 is sent to the ATM exchange 22 from the ATM exchange 21 (see P shown in FIG. 16), the ATM exchange 22 detects a presence or absence of an inconsistency in the setting of the selection rights for the VPC 25 according to the VPC selection right notification message 28. If an inconsistency has been found, and if the current operation mode is one in which the selection right of the ATM exchange is changed so as to comply with the selection right specified by the ATM exchange 21, the VPC selection right response message 28 is returned to the ATM exchange 21 after the setting of the selection right for the VPC 25 have been changed (see Q shown in FIG. 16). The ATM exchange 21 detects a presence or absence of an inconsistency in the setting of the selection right for the VPC 25 according to the VPC selection right response message 28. If an inconsistency has been found (or if the inconsistency in the setting has not been eliminated yet), the setting of the selection right for the VPC 25 is changed, because the current operation mode is determined to be one in which the selection right is changed so as to comply with the selection right specified by the ATM exchange 22.

The following four operation modes are conceivable as operation modes of the ATM exchanges 21 and 22 of the third embodiment.

(1) An operation mode in which the SPC number of the ATM exchange 21 is larger than the SPC number of the ATM exchange 22, and the selection right for the VPC 25 is changed so as to comply with the setting of the selection right specified by the ATM exchange having a larger SPC number (i.e., the ATM exchange 21).

(2) An operation mode in which the SPC number of the ATM exchange 21 is larger than the SPC number of the ATM exchange 22, and the selection right for the VPC 25 is changed so as to comply with the setting of the selection right specified by the ATM exchange having a smaller SPC number (i.e., the ATM exchange 22).

(3) An operation mode in which the SPC number of the ATM exchange 21 is smaller than the SPC number of the ATM exchange 22, and the selection right for the VPC 25 is changed so as to comply with the setting of the selection right specified by the ATM exchange having a larger SPC number (i.e., the ATM exchange 22).

(4) An operation mode in which the SPC number of the ATM exchange 21 is smaller than the SPC number of the ATM exchange 22, and the selection right for the VPC 25 is changed so as to comply with the setting of the selection right specified by the ATM exchange having a smaller SPC number (i.e., the ATM exchange 21).

These operation modes will be further described hereinbelow with reference to FIG. 5 and FIGS. 7 to 20.

(1) An operation mode in which the SPC number of the ATM exchange 21 is larger than the SPC number of the ATM exchange 22, and the selection right for the VPC 25 is changed so as to comply with the setting of the selection right specified by the ATM exchange having a larger SPC number (i.e., the ATM exchange 21).

The operations of the ATM exchanges 21 and 22 in this operation mode will be described with reference to the flowcharts shown in FIGS. 17 and 19.

Figure 17:
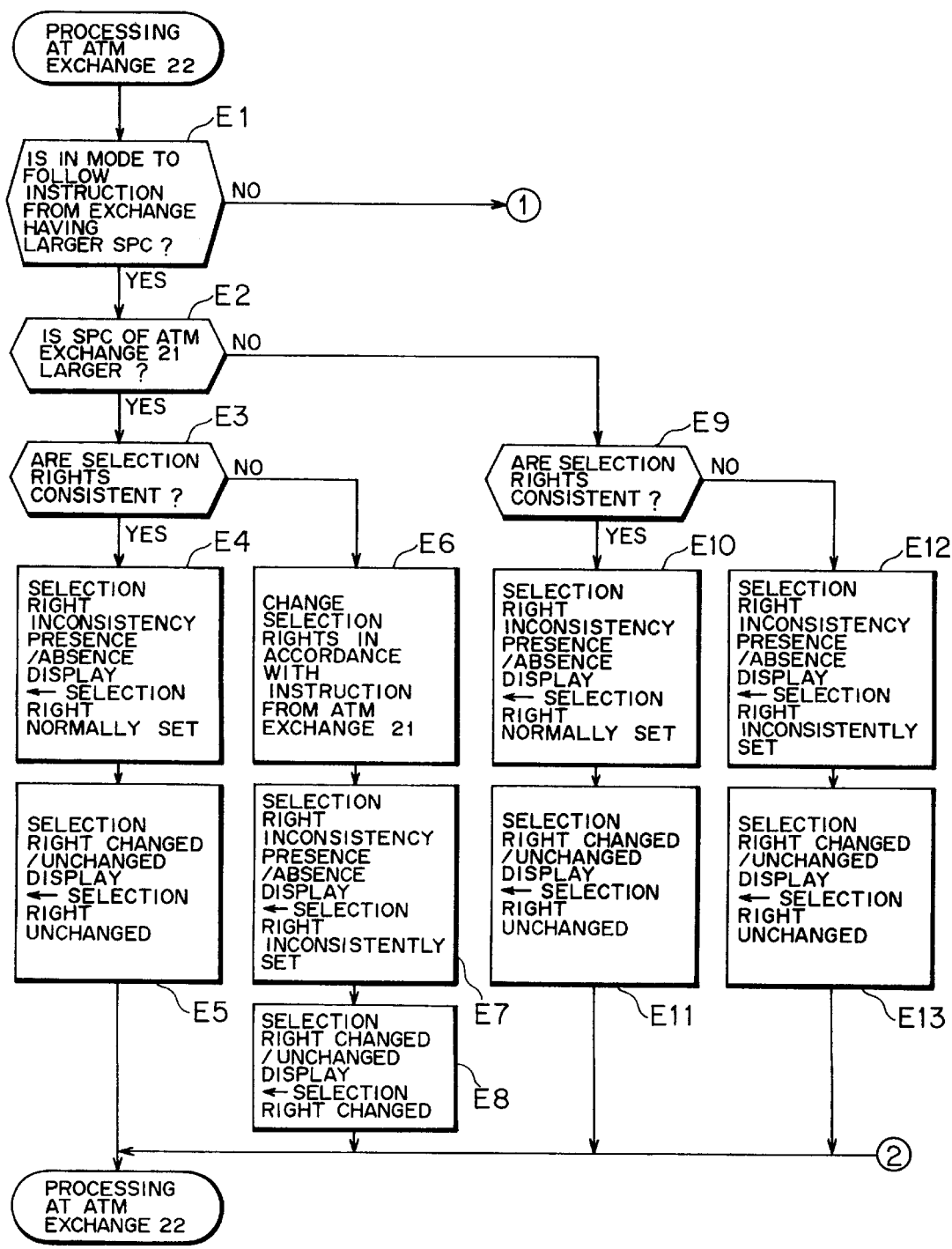
FIG. 17 is a flowchart for explaining the operation of an ATM exchange according to the third embodiment of the present invention.

When the message acquisition section 24B of the control processor 24 provided for the ATM exchange 22 has received the VPC selection right notification message 28 from the control processor 23 provided for the ATM exchange 21, the inconsistency detection section 24C determines whether the current operation mode is either a mode in which setting of the selection right of the ATM exchange with a smaller SPC number for the VPC 25 is changed so as to comply with the VPC 25 selection right specified by the ATM exchange having a larger SPC number, or a mode in which setting of the selection right of the ATM exchange with a larger SPC number for the VPC 25 is changed so as to comply with the VPC 25 selection right specified by the ATM exchange having a smaller SPC number (step E1 shown in FIG. 17).

In this case, the current operation mode is a mode in which the setting of the selection right of the ATM exchange having a smaller SPC number for the VPC 25 is changed so as to comply with the VPC 25 selection right specified by the ATM exchange having a larger SPC number. Therefore, the inconsistency detection section 24C extracts an SPC number of the partner station (i.e., the ATM exchange 21) from a routing label of the VPC selection right notification message 28 received from the control processor 23, as previously described. The thus-extracted SPC number is compared with the SPC number of the station itself (i.e., the ATM exchange 22). It is determined whether the SPC number of the ATM exchange 21 is larger than the SPC number of the ATM exchange 22. Based on the result of such determination, it is further decided which of the ATM exchange 21 or the ATM exchange 22 has priority to select the VPC 25 (the processing proceeds to YES in step E1 to step E2 shown in FIG. 17).

In this case, the ATM exchange 21 is judged to have a large SPC number. Therefore, the inconsistency detection section 24C determines whether the setting of the VPC 25 selection right specified by the parameter 29 (see FIG. 8) included in the VPC selection right notification message 28 received from the ATM exchange 21 is consistent with the setting of the VPC 25 selection right of the ATM exchange 22 (the processing proceeds to YES in step E2 to step E3 shown in FIG. 17).

If the selection rights are consistent with each other, the message notification section 24A of the control processor 24 sets selection right inconsistency absence information (a selection right inconsistency presence/absence display is set to a "selection right normally set") and selection right unchanged information (a selection right changed/ unchanged display is set to an "selection right unchanged") in the parameter 30 (see FIG. 9) included in the VPC selection right response message 28. Then, the VPC selection right response message 28 is returned to the message acquisition section 23B of the control processor 23 provided for the ATM exchange 21 via the signal line 26 (the processing proceeds to YES in step E3 to step E4 and step E5 shown in FIG. 17).

If the selection rights are inconsistent with each other, the selection right change section 24D of the control processor 24 changes the selection right of the originating ATM exchange for the VPC 25, so as to comply with the VPC 25 selection right specified by the VPC selection right notification message 28 that is received from the ATM exchange 21 (the processing proceeds to NO in step E3 to step E6 shown in FIG. 17). The message notification section 24A sets selection right inconsistency presence information (the selection right inconsistency presence/absence display is set to an "selection right inconsistently set") and selection right changed information (the selection right changed/unchanged display is set to a "selection right changed") in the parameter 30 included in the VPC selection right response message 28. Then, the VPC selection right response message 28 is returned to the message acquisition section 23B of the control processor 23 provided for the ATM exchange 21 via the signal line 26 (steps E7 and E8 shown in FIG. 17).

Figure 19:
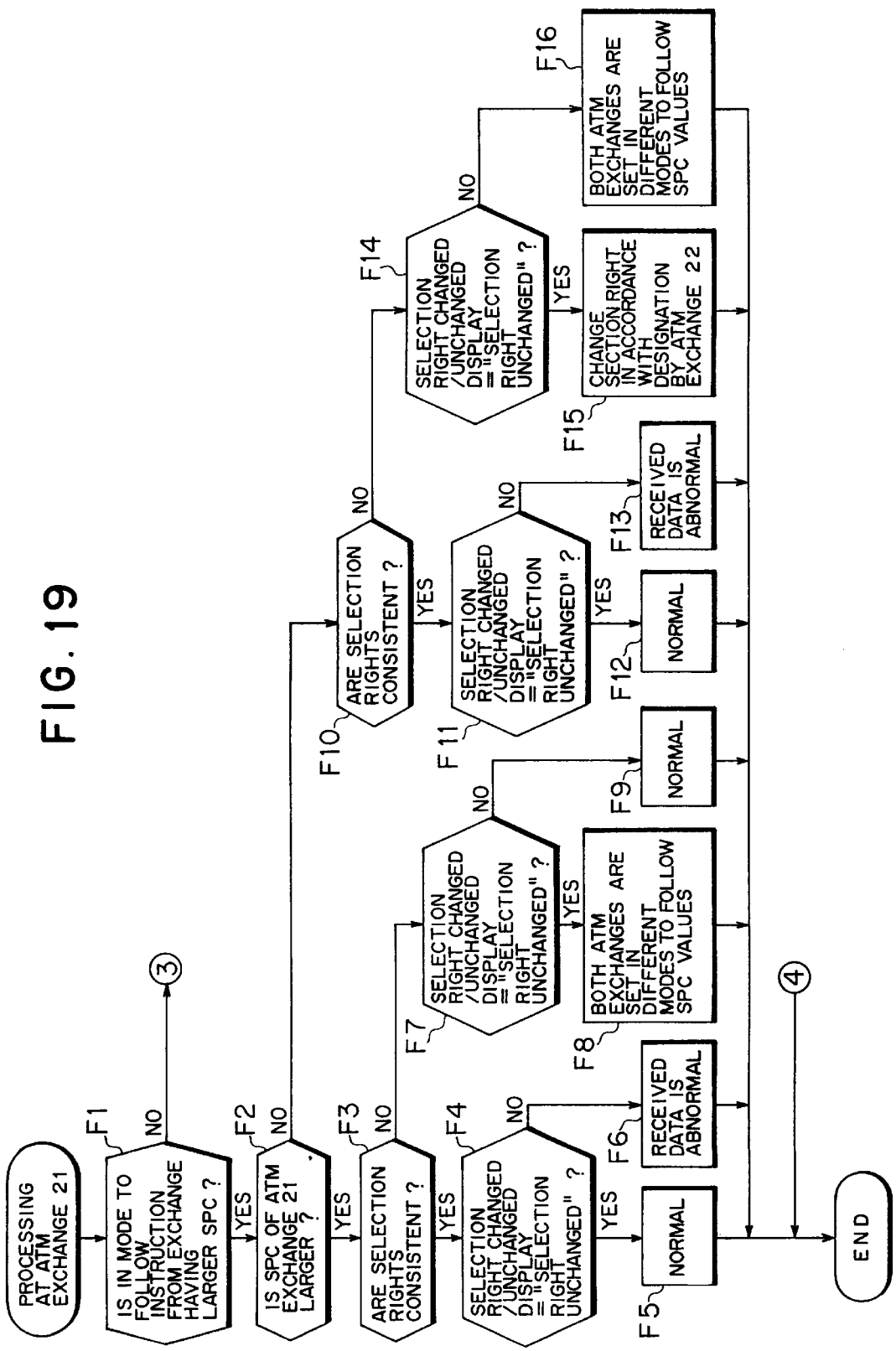
FIG. 19 is a flowchart for explaining the operation of the ATM exchange of the third embodiment of the present invention.

When the message acquisition section 23B of the control processor 23 has received the VPC selection right response message 28 from the control processor 24, the inconsistency detection section 23C of the control processor 23 determines whether the current operation mode is either a mode in which setting of the VPC 25 selection right of the ATM exchange with a smaller SPC is changed so as to comply with the VPC 25 selection right specified by the ATM exchange having a larger SPC number, or a mode in which setting of the VPC 25 selection right of the ATM exchange with a larger SPC number is changed so as to comply with the VPC 25 selection right specified by the ATM exchange having a smaller SPC number (step F1 shown in FIG. 19).

In this case, the current operation mode is a mode in which the setting of the VPC 25 selection right of the ATM exchange having a smaller SPC number is changed so as to comply with the VPC 25 selection right specified by the ATM exchange having a larger SPC number. Therefore, the inconsistency detection section 23C extracts the SPC number of the partner station (i.e., the ATM exchange 22) from the routing label of the VPC selection right response message 28 received from the control processor 24, as previously described. The thus-extracted SPC number is compared with the SPC number of the station itself (i.e., the ATM exchange 21). Based on the result of the comparison, it is determined whether the SPC number of the ATM exchange 21 is larger than the SPC number of the ATM exchange 22. Based on the result of such determination, it is decided which of the ATM exchange 21 or the ATM exchange 22 has priority to select the VPC 25 (the processing proceeds to YES in step F1 to step F2 shown in FIG. 19).

In this case, the ATM exchange 21 is judged to have a large SPC number. Therefore, the inconsistency detection section 23C determines whether the selection right inconsistency presence information (the selection right inconsistency presence/absence display is set to the "selection right inconsistently set") regarding the VPC 25 has been set in the parameter 30 (see FIG. 9) included in the VPC selection right response message 28 received from the ATM exchange 22. Based on the result of such determination, it is judged whether an inconsistency is present in the setting of the selection rights of the ATM exchanges 21 and 22 for the VPC 25 (the processing proceeds to YES in step F2 to step F3 shown in FIG. 19).

If the selection rights are consistent with each other, the inconsistency detection section 23C determines whether the selection right unchanged information (the selection right changed/unchanged display is set to the "selection right unchanged") regarding the VPC 25 has been set in the parameter 30 included in the VPC selection right response message 28 (the processing proceeds to YES in step F3 to step F4 shown in FIG. 19). If the selection right unchanged information is detected, it is found that the selection rights of the ATM exchanges 21 and 22 for the VPC 25 are correct (the processing proceeds to YES in step F4 to step F5 shown in FIG. 19). In contrast, if the selection right unchanged information is not detected [or the selection right changed information (the selection right changed/unchanged display is set to the "selection right changed") is detected], it is found that the control processors 23 and 24 of the ATM exchanges 21 and 22 have erroneously operated for reasons of abnormal received data (or the VPC selection right response message 28) (the processing proceeds to NO in step F4 to F6 shown in FIG. 19).

In contrast, if the selection rights are inconsistent with each other, the inconsistency detection section 23C determines whether the selection right unchanged information regarding the VPC 25 has been set in the parameter 30 included in the VPC selection right response message 28 (the processing proceeds to NO in step F3 to step F7 shown in FIG. 19). If the selection right unchanged information is not detected, it is found that the selection rights of the ATM exchanges 21 and 22 for the VPC 25 are correct (the processing proceeds to NO in step F7 to step F9 shown in FIG. 19). In contrast, if the selection right unchanged information is detected, it is found that the selection rights of the ATM exchanges 21 and 22 for the VPC 25 have not been correctly set according to the SPC number (the processing proceeds to YES in step F7 to F8 shown in FIG. 19).

(2) An operation mode in which the SPC number of the ATM exchange 21 is larger than the SPC number of the ATM exchange 22, and the selection right for the VPC 25 is changed so as to comply with the setting of the selection right specified by the ATM exchange having a smaller SPC number (i.e., the ATM exchange 22).

The operations of the ATM exchanges 21 and 22 in this operation mode will be described with reference to the flowcharts shown in FIGS. 18 and 20.

In this case, in step E1 shown in FIG. 17, the current operation mode is determined to be a mode in which the setting of the VPC 25 selection right of the ATM exchange having a larger SPC number is changed so as to comply with the VPC 25 selection right specified by the ATM exchange having a smaller SPC number. Therefore, the inconsistency detection section 24C extracts an SPC number of the partner station (i.e., the ATM exchange 21) from the routing label of the VPC selection right notification message 28 received from the control processor 23, as previously described. The thus-extracted SPC number is compared with the SPC number of the station itself (i.e., the ATM exchange 22). It is determined whether the SPC number of the ATM exchange 21 is larger than the SPC number of the ATM exchange 22. Based on the result of such determination, it is further decided which of the ATM exchange 21 or the ATM exchange 22 is priority to select the VPC 25 (the processing proceeds to NO in step E1 shown in FIG. 17 to step E14 shown in FIG. 18).

In this case, the ATM exchange 21 is judged to have a large SPC number. Therefore, the inconsistency detection section 24C determines whether the setting of the VPC 25 selection right specified by the parameter 29 (see FIG. 8) that is included in the VPC selection right notification message 28 received from the ATM exchange 21 is consistent with the setting of the VPC 25 selection right of the ATM exchange 22 (the processing proceeds to YES in step E14 to step E15 shown in FIG. 18).

If the selection rights are consistent with each other, the message notification section 24A of the control processor 24 sets the selection right inconsistency absence information (the selection right inconsistency presence/absence display is set to the "selection right normally set") and the selection right unchanged information (the selection right changed/unchanged display is set to the "selection right unchanged) in the parameter 30 (see FIG. 9) included in the VPC selection right response message 28. Then, the VPC selection right response message 28 is returned to the message acquisition section 23B of the control processor 23 provided for the ATM exchange 21 via the signal line 26 (the processing proceeds to YES in step E15 to steps E16 and E17 shown in FIG. 18).

If the selection rights are inconsistent with each other, the selection right change section 24D of the control processor 24 does not change the selection right for the VPC 25 because the selection right of the ATM exchange 21 for the VPC 25 is changed so as to comply with the VPC 25 selection right of the ATM exchange 22 having a small SPC number. The message notification section 24A sets the selection right inconsistency present information (the selection right inconsistency presence/absence display is set to the "selection right inconsistently set") and the selection right unchanged information (the selection right changed/unchanged display is set to the "selection right unchanged") in the parameter 30 (see FIG. 9) included in the VPC selection right response message 28. Then, the VPC selection right response message 28 is returned to the message acquisition section 23B of the control processor 23 provided for the ATM exchange 21 via the signal line 26 (steps NO in step E15 to steps E18 and E19 shown in FIG. 18).

When the message acquisition section 23B of the control processor 23 has received the VPC selection right response message 28 from the control processor 24, the inconsistency detection section 23C of the control processor 23 determines the current operation mode is a mode in which the setting of the VPC 25 selection right of the ATM exchange having a large SPC number is changed so as to comply with the VPC 25 selection right specified by the ATM exchange having a smaller SPC number, in step F1 shown in FIG. 19. Therefore, the inconsistency detection section 23C extracts the SPC number of the partner station (i.e., the ATM exchange 22) from a routing label of the VPC selection right response message 28 received from the control processor 24, as previously described. The thus-extracted SPC number is compared with the SPC number of the station itself (i.e., the ATM exchange 21). It is determined whether the SPC number of the ATM exchange 21 is larger than the SPC number of the ATM exchange 22. Based on the result of such determination, it is decided which of the ATM exchange 21 or the ATM exchange 22 has priority to select the VPC 25 (the processing proceeds to NO in step F1 to step F17 shown in FIG. 20).

In this case, the ATM exchange 21 is judged to have a large SPC number. Therefore, the inconsistency detection section 23C determines whether the selection right inconsistency presence information (the selection right inconsistency presence/absence display is set to the "selection right inconsistently set") regarding the VPC 25 has been set in the parameter 30 (see FIG. 9) included in the VPC selection right response message 28 received from the ATM exchange 22. Based on the result of such determination, it is judged whether no inconsistency is present in the setting of the selection rights of the ATM exchanges 21 and 22 for the VPC 25 (the processing proceeds to YES in step F17 to step F18 shown in FIG. 20).

Figure 20:
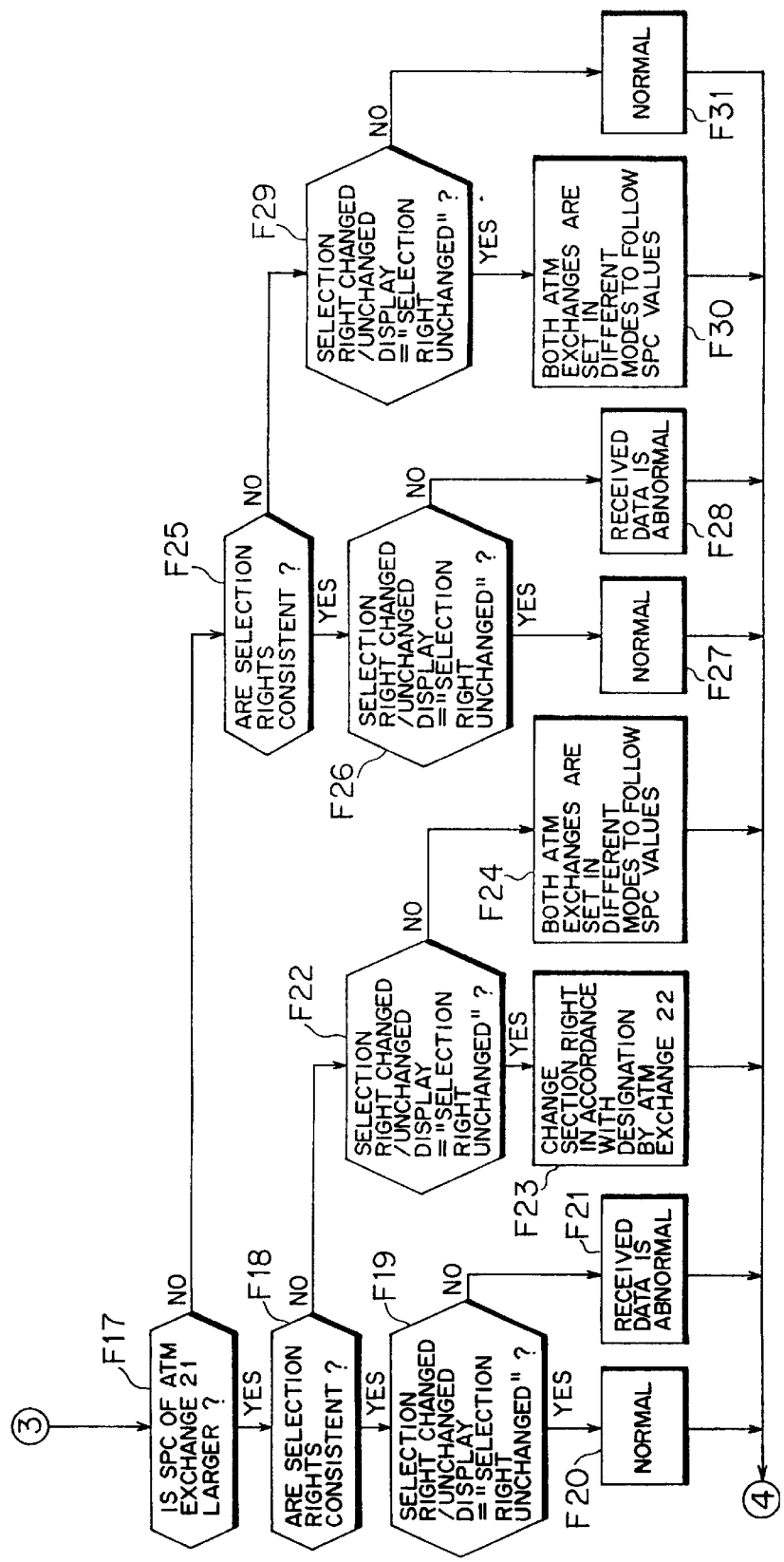
FIG. 20 is a flowchart for explaining the operation of the ATM exchange of the third embodiment of the present invention.

If the selection rights are consistent with each other, the inconsistency detection section 23C determines whether the selection right unchanged information (the selection right changed/unchanged selection right display is set to the "selection right unchanged") regarding the VPC 25 has been set in the parameter 30 included in the VPC selection right response message 28 (the processing proceeds to YES in step F18 to step F19 shown in FIG. 20). If the selection right unchanged information is detected, it is found that the selection rights of the ATM exchanges 21 and 22 for the VPC 25 are correct (the processing proceeds to YES in step F19 to step F20 shown in FIG. 20). In contrast, if the selection right unchanged information is not detected [or the selection right changed information (the selection right changed/unchanged display is set to the "selection right changed") is detected], it is found that the control processors 23 and 24 of the ATM exchanges 21 and 22 have erroneously operated for reasons of abnormal received data (or the VPC selection right response message 28) (the processing proceeds to NO in step F19 to F20 shown in FIG. 20).

In contrast, if the selection rights are inconsistent with each other, the inconsistency detection section 23C determines whether the selection right unchanged information regarding the VPC 25 has been set in the parameter 30 included in the VPC selection right response message 28 (the processing proceeds to NO in step F18 to step F22 shown in FIG. 20). If the selection right unchanged information is detected, the selection right change section 23D of the control processor 23 provided for the ATM exchange 21 changes the VPC 25 selection right of the originating ATM exchange so as to comply with the VPC 25 selection right specified by the VPC selection right response message 28 received from the ATM exchange 22 (the processing proceeds to YES in step F22 to a step F23 shown in FIG. 20). In contrast, if the selection right unchanged information is not detected (or the selection right changed information is detected), it is found that the selection rights of the ATM exchanges 21 and 22 for the VPC 25 have not been correctly set according to the SPC number (the processing proceeds to NO in step F22 to F24 shown in FIG. 20).

(3) An operation mode in which the SPC number of the ATM exchange 21 is smaller than the SPC number of the ATM exchange 22, and the selection right for the VPC 25 is changed so as to comply with the setting of the selection right specified by the ATM exchange having a larger SPC number (i.e., the ATM exchange 22).

The operations of the ATM exchanges 21 and 22 in this operation mode will be described with reference to the flowcharts shown in FIGS. 17 and 19.

In this case, in step E2 shown in FIG. 17, the ATM exchange 21 is judged to have a small SPC number. Therefore, the inconsistency detection section 24C determines whether the setting of the VPC 25 selection right specified by the parameter 29 (see FIG. 8) that is included in the VPC selection right notification message 28 received from the ATM exchange 21 is consistent with the setting of the VPC 25 selection right of the ATM exchange 22 (the processing proceeds to NO in step E2 to step E9 shown in FIG. 17).

If the selection rights are consistent with each other, the message notification section 24A of the control processor 24 sets the selection right inconsistency absence information (the selection right inconsistency presence/absence display is set to the "selection right normally set") and the selection right unchanged information (the selection right changed/unchanged display is set to the "selection right unchanged") in the parameter 30 (see FIG. 9) included in the VPC selection right response message 28. Then, the VPC selection right response message 28 is returned to the message acquisition section 23B of the control processor 23 provided for the ATM exchange 21 via the signal line 26 (the processing proceeds to YES in step E9 to steps E10 and E11 shown in FIG. 17).

If the selection rights are inconsistent with each other, the selection right change section 24D of the control processor 24 does not change the selection right for the VPC 25 because the selection right of the ATM exchange 21 for the VPCs 25 is changed so as to comply with the VPC 25 selection right of the ATM exchange 22 having a large SPC number. The message notification section 24A sets the selection right inconsistency present information (the selection right inconsistency presence/absence display is set to the "selection right inconsistently set") and the selection right unchanged information (the selection right changed/unchanged display is set to the "selection right unchanged") in the parameter 30 included in the VPC selection right response message 28. Then, the VPC selection right response message 28 is returned to the message acquisition section 23B of the control processor 23 provided for the ATM exchange 21 via the signal line 26 (the processing proceeds to NO in step E9 to steps E12 and E13 shown in FIG. 17).

When the message acquisition section 23B of the control processor 23 has received the VPC selection right response message 28 from the control processor 24, the inconsistency detection section 23C of the control processor 23 determines that the ATM exchange 21 has a small SPC number, in step F2 shown in FIG. 19. Therefore, the inconsistency detection section 23C determines whether the selection right inconsistency present information (the selection right inconsistency presence/absence display is set to the "selection right inconsistently set") regarding the VPC 25 has been set in the parameter 30 (see FIG. 9) included in the VPC selection right response message 28 received from the ATM exchange 22. Based on the result of such determination, it is judged whether no inconsistency is present in the setting of the selection rights of the ATM exchanges 21 and 22 for the VPC 25 (the processing proceeds to NO in step F2 to step F10 shown in FIG. 19).

If the selection rights are consistent with each other, the inconsistency detection section 23C determines whether the selection right unchanged information (the selection right changed/unchanged display is set to the "selection right unchanged") regarding the VPC 25 has been set in the parameter 30 included in the VPC selection right response message 28 (the processing proceeds to YES in step F10 to step F11 shown in FIG. 19). If the selection right unchanged information is detected, it is found that the selection rights of the ATM exchanges 21 and 22 for the VPC are correct (the processing proceeds to YES in step F11 to step F12 shown in FIG. 19). In contrast, if the selection right unchanged information is not detected, it is found that the control processors 23 and 24 of the ATM exchanges 21 and 22 may have erroneously operated for reasons of abnormal received data (or the abnormal VPC selection right response message 28) (the processing proceeds to NO in step F11 to F13 shown in FIG. 19).

In contrast, if the selection rights are inconsistent with each other, the inconsistency detection section 23C determines whether the selection right unchanged information regarding the VPC 25 has been set in the parameter 30 included in the VPC selection right response message 28 (the processing proceeds to NO in step F10 to step F14 shown in FIG. 19). If the selection right unchanged information is detected, the selection right change section 23D of the control processor 23 provided for the ATM exchange 21 changes the VPC 25 selection right of the originating ATM exchange so as to comply with the VPC 25 selection right specified by the VPC selection right response message 28 received from the ATM exchange 22 (the processing proceeds to YES in step F14 to a step F15 shown in FIG. 19). In contrast, if the selection right unchanged information is not detected (or the selection right changed information is detected), it is found that the selection rights of the ATM exchanges 21 and 22 for the VPC 25 have not been correctly set according to the SPC number (the processing proceeds to NO in step F14 to F16 shown in FIG. 19).

(4) An operation mode in which the SPC number of the ATM exchange 21 is smaller than the SPC number of the ATM exchange 22, and the selection right for the VPC 25 is changed so as to comply with the setting of the selection right specified by the ATM exchange having a smaller SPC number (i.e., the ATM exchange 21).

The operations of the ATM exchanges 21 and 22 in this operation mode will be described with reference to the flowcharts shown in FIGS. 18 and 20.

Figure 18:
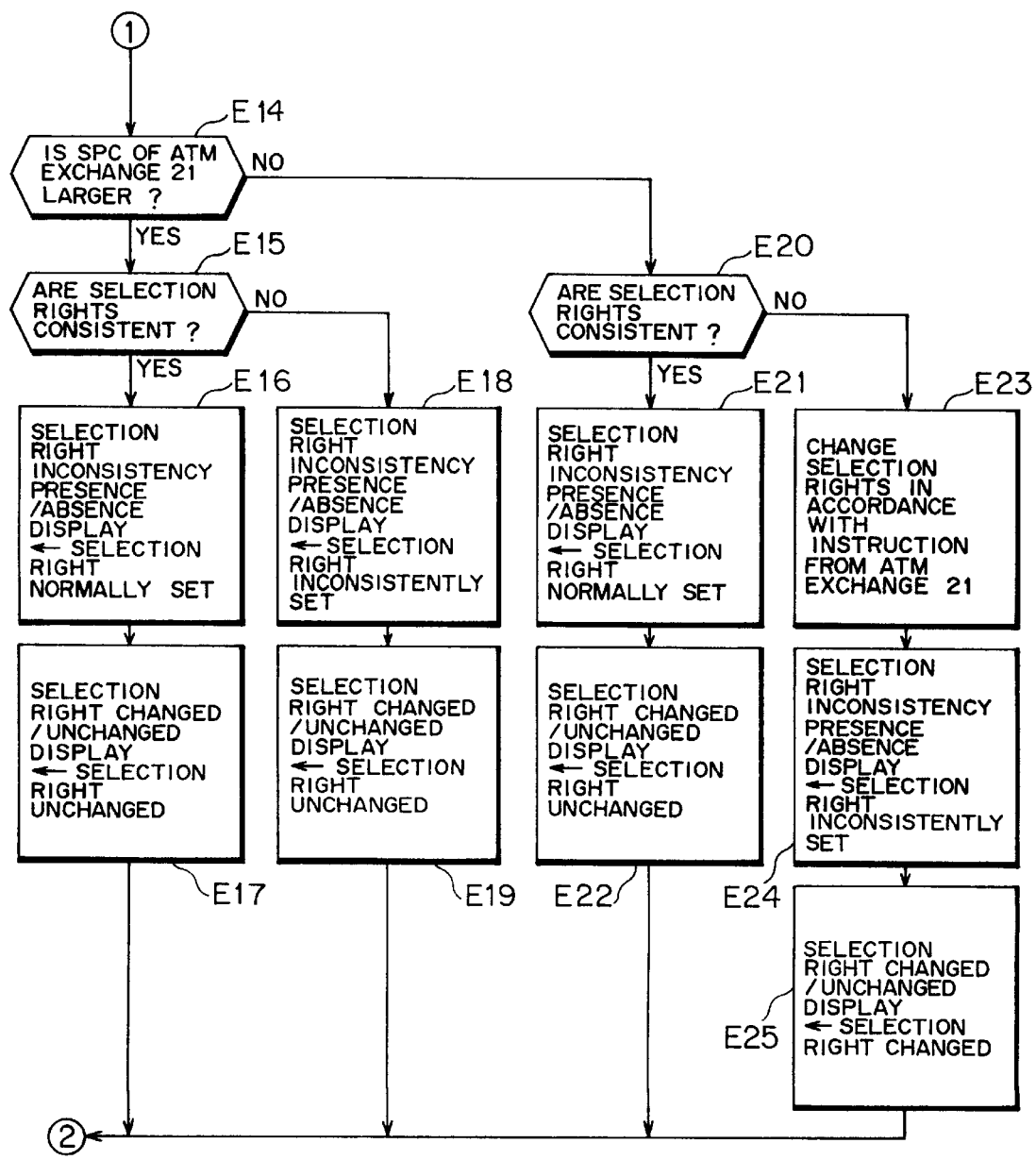
FIG. 18 is a flowchart for explaining the operation of the ATM exchange of the third embodiment of the present invention.

In this case, in step E14 shown in FIG. 18, the ATM exchange 21 is judged to have a small SPC number. Therefore, the inconsistency detection section 24C determines whether the setting of the VPC 25 selection right specified by the parameter 29 (see FIG. 8) that is included in the VPC selection right notification message 28 received from the ATM exchange 21 is consistent with the setting of the VPC 25 selection right of the ATM exchange 22 (the processing proceeds to NO in step E14 to step E20 shown in FIG. 18).

If the selection rights are consistent with each other, the message notification section 24A of the control processor 24 sets the selection right inconsistency absence information (the selection right inconsistency presence/absence display is set to the "selection right normally set") and the selection right unchanged information (the selection right changed/unchanged display is set to the "selection right unchanged") in the parameter 30 (see FIG. 9) included in the VPC selection right response message 28. Then, the VPC selection right response message 28 is returned to the message acquisition section 23B of the control processor 23 provided for the ATM exchange 21 via the signal line 26 (the processing proceeds to YES in step E20 to steps E21 and E22 shown in FIG. 18).

If the selection rights are inconsistent with each other, the selection right change section 24D of the control processor 24 changes the right of the originating ATM exchange to select the VPC so as to comply with the VPC 25 selection right specified by the VPC selection right notification message 28 received from the ATM exchange 21 (the processing proceeds to NO in step E20 to step E23 shown in FIG. 18). The message notification section 24A sets the selection right inconsistency presence information (the selection right inconsistency presence/absence display is set to the "selection right inconsistently set") and the selection right changed information (the selection right changed/unchanged display is set to the "selection right changed") in the parameter 30 included in the VPC selection right response message 28. Then, the VPC selection right response message 28 is returned to the message acquisition section 23B of the control processor 23 provided for the ATM exchange 21 via the signal line 26 (steps E24 and E25 shown in FIG. 18).

When the message acquisition section 23B of the control processor 23 has received the VPC selection right response message 28 from the control processor 24, the inconsistency detection section 23C of the control processor 23 determines the ATM exchange 21 to have a small SPC number, in step F17 shown in FIG. 20. Therefore, the inconsistency detection section 23C determines whether the selection right inconsistency presence information (the selection right inconsistency presence/absence display is set to the "selection right inconsistently set") regarding the VPC 25 has been set in the parameter 30 (see FIG. 9) included in the VPC selection right response message 28 received from the ATM exchange 22. Based on the result of such determination, it is judged whether no inconsistency is present in the setting of the selection rights of the ATM exchanges 21 and 22 for the VPC 25 (the processing proceeds to NO in step F17 to step F25 shown in FIG. 20).

If the selection rights are consistent with each other, the inconsistency detection section 23C determines whether the selection right unchanged information (the selection right changed/unchanged selection is set to the "selection right unchanged") regarding the VPC 25 has been set in the parameter 30 included in the VPC selection right response message 28 (the processing proceeds to YES in step F25 to step F26 shown in FIG. 20). If the selection right unchanged information is detected, it is found that the selection rights of the ATM exchanges 21 and 22 for the VPC 25 are correct (the processing proceeds to YES in step F26 to step F27 shown in FIG. 20). In contrast, if the selection right unchanged information is not detected, it is found that the control processors 23 and 24 of the ATM exchanges 21 and 22 may have erroneously operated for reasons of abnormal received data (or the abnormal VPC selection right response message 28) (the processing proceeds to NO in step F26 to F28 shown in FIG. 20).

In contrast, if the selection rights are inconsistent with each other, the inconsistency detection section 23C determines whether the selection right unchanged information regarding the VPC 25 has been set in the parameter 30 included in the VPC selection right response message 28 (the processing proceeds to NO in step F25 to step F29 shown in FIG. 20). If the selection right unchanged information is not detected (the selection right changed information is detected), it is found that the selection rights of the ATM exchanges 21 and 22 for the VPC 25 are correctly set (the processing proceeds to NO in step F29 to F31 shown in FIG. 20). In contrast, if the selection right unchanged information is, it is found that the selection rights of the ATM exchanges 21 and 22 for the VPC 25 have not been correctly set according to the SPC number (the processing proceeds to YES in step F29 to F30 shown in FIG. 20).

As in the first embodiment, as shown in FIG. 12, when a VPC 25 is newly or additionally provided between the ATM exchanges 21 and 22, it is checked whether or not an inconsistency is present in the setting of the selection right for the VPC 25, before the thus-newly or additionally provided VPC 25 becomes available for call/connection. In this state. Only when the setting has been found to have no inconsistency, that VPC 25 can be made available.

As illustrated in; e.g., FIGS. 11 and 15, even when the VPC 25 existing between the ATM exchanges 21 and 22 is already usable for call/connection, it is checked whether or not an inconsistency is present in the setting of the selection rights for the VPC 25 through exchange of the messages 28 similar to those used in the previous embodiment. If an inconsistency is present in the setting of the selection rights for the VPC 25, the right of one of the ATM exchanges 21 and 22 to select the VPC 25 can be changed so as to comply with the selection right specified by the other ATM exchange according to the SPC numbers assigned to the ATM exchanges 21 and 22.

As in the first embodiment, as illustrated in FIG. 13, even when the VPC 25 existing between the ATM exchanges 21 and 22 is already usable for call/connection, it is checked whether or not an inconsistency is present in the setting of the selection rights for the VPC 25. If an inconsistency if present in the setting of the selection rights for the VPC 25, that VPC 25 is made unavailable for call/connection.

As described above, the ATM exchanges 21 and 22 of the third embodiment of the present invention also check whether or not an inconsistency is present in the setting of the selection rights of the ATM exchanges 21 and 22 for the VPC 25, using the VPC selection right notification message 28 and the VPC selection right response message 28 which are original messages in compliance with BISUP. If the setting has been found to have an inconsistency, the setting of the selection rights for that VPC 25 is corrected. As a result, it is also possible to obtain the same effects as those obtained by the ATM exchanges 21 and 22 of the first and second embodiments.

(e) First Modification of the Embodiments of the Present Invention

The messages including the original parameters 29 and 30 (see FIGS. 8 and 9) which are not defined by the recommendations of ITU-T, have been used as the VPC selection right notification message and the VPC selection right response message (see FIG. 7) in the first through third embodiments of the present invention. The existing messages that are used in BISUP, can be used as the VPC selection right notification message and the VPC selection right response message. As in the case of the previous embodiments, it is possible to check and correct inconsistencies in the setting of the selection rights for the VPC 25.

The messages used in BISUP are as follows; namely, an IAM (Initial Address Message) which is used for requesting establishment of call/connection; IAA (IAM Acknowledgment Message) which is an authorization response message; and IAR (IAM Reject Message) which is a rejection response message with respect to the IAM.

The format of these message is the same as that shown in FIG. 7.

FIGS. 25 through 27 illustrate a list of parameters included in the IAM, IAA, and IAR. The formats of these parameters are also the same as those shown in FIGS. 8 and 9. These parameters are different from the parameters shown in FIGS. 8 and 9 only in the information to be stored in the contents of the parameters.

Of all the VPC 25 for which the selection right of the originating ATM exchange are set, VPCI/VCI numbers of a VPC 25 which has an effective band (a residual band which is sufficient to provide connection for a corresponding call) and an attribute, are set as a CEI (Connection Element Identifier) parameter (see the underlined parameter shown in FIGS. 25 and 26) which is one of the parameters included in the IAM and IAA. More specifically, the CEI parameter has a format shown in FIG. 28 (see reference numeral 35 shown in FIG. 28).

In the present embodiment, the IAA and IAR comprise a parameter 30 which is the same as that shown in FIG. 9, in addition to the previously-described parameters.

Specifically, in the present modification, the IAM, IAA, and IAR comprise parameters (a CEI parameter 35 and the parameter 30) which are information about the selection rights of the ATM exchanges 21 and 22 for the VPC 25. As a result, it is possible for the ATM exchanges 21 and 22 to exchange messages between them for checking and correcting the selection rights for the VPC 25 arbitrarily set between the ATM exchanges 21 and 22. In the present modification, the IAM is used as the VPC selection right notification message, and the IAA and IAR are used as the VPC selection right response message.

Even in the present modification, the ATM exchanges 21 and 22 detect an inconsistency in the setting of the selection right for the VPC 25, through exchange of a message between them. In the event that there is found an inconsistency in the setting of the selection rights, the right of one of the ATM exchanges 21 and 22 to select the VPC 25 is changed so as to comply with the selection right specified by the other ATM exchange, whereby the inconsistency in the setting of the selection rights is corrected.

Figure 21:
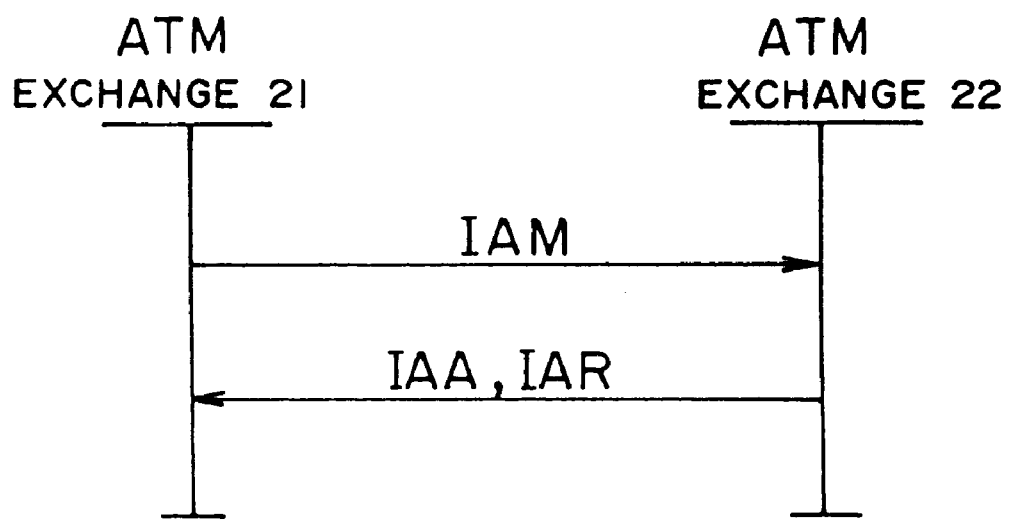
FIG. 21 is a diagram showing a signal sequence used between ATM exchanges according to a first modification of the embodiments of the present invention.

As illustrated in FIG. 21, it is assumed that the ATM exchange 21 is a sender of the IAM, and that the ATM exchange 22 is a receiver of the IAM (i.e., a sender of the IAA and IAR) in the present modification. Under this assumption, the functions of the constituent elements of the control processors 23 and 24 will be described.

In the present modification, the message notification section 23A of the control processor 23 shown in FIG. 5 sends the IAM.

More specifically, of all the VPCs 25 for which the selection right of the ATM exchange 21 is set, one VPC 25 has an effective band (or a sufficient residual band to allow connection of the corresponding call) and an attribute. In such a case, the message notification section 23A searches the route table 27 for the VPCI/VCI (Virtual Channel Identifier) numbers which specify that VPC 25. Then, the message notification section 23A generates a CEI parameter 35 shown in FIG. 28 and sends the IAM including the thus-generated CEI parameter 35.

Figure 22:
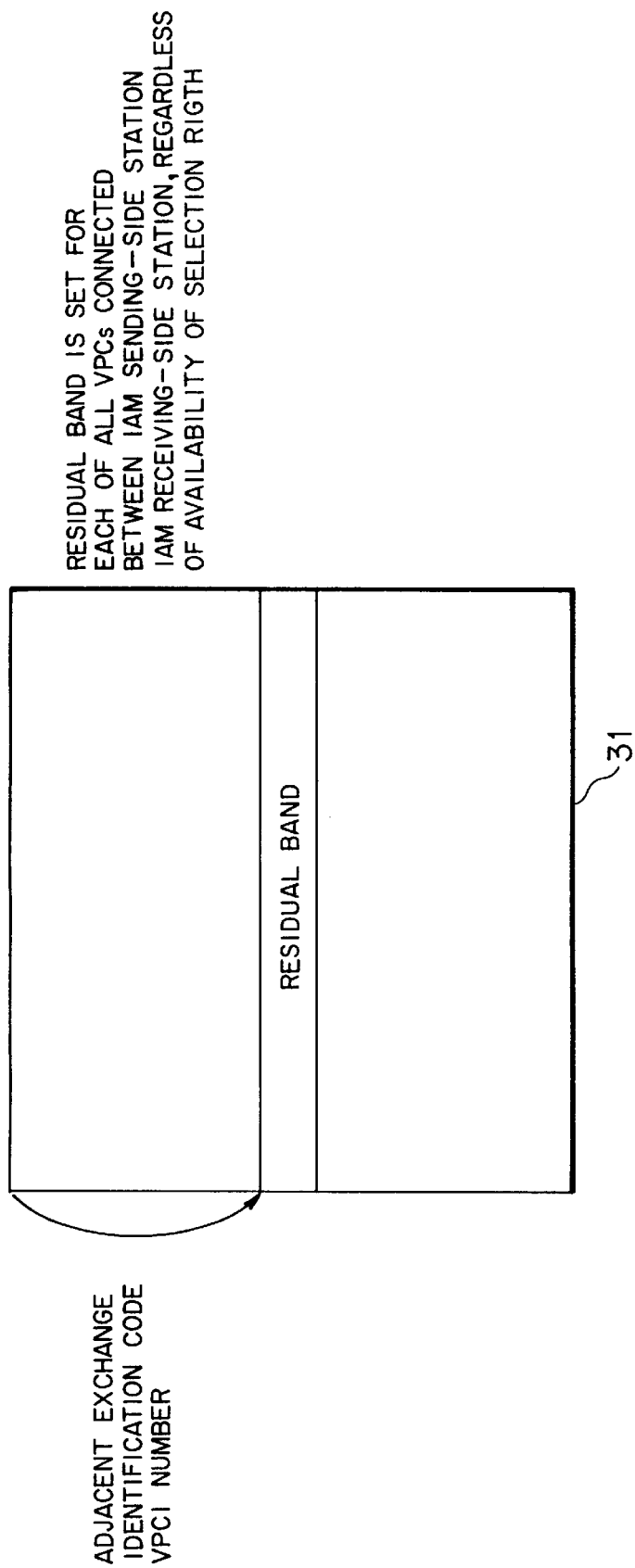
FIG. 22 is a diagram for explaining the configuration of a residual band table.

For each VPC 25, residual bands of all the VPCs 25 set between the ATM exchanges 21 and 22 are set in; e.g., a residual band table 31 shown in FIG. 22. The residual band table 31 is held in, for example, each of the memories 33 and 34 of the ATM exchangers 21 and 22.

The residual band of each VPC 25 is set in the residual band table 31 regardless of whether or not the ATM exchange 21 has a selection right for the VPC 25.

If there are a plurality of VPCs 25 capable of connecting a corresponding call, the message notification section 23A selects the VPC(s) 25 having the largest residual band. Furthermore, if there are a plurality of VPCs 25 having the largest residual band, the message notification section 23A selects a VPC 25 having the smallest VPCI number from them.

If there is a VPC 25 capable of connecting a corresponding call, the message notification section 23A updates the residual band of this VPC 25 provided in the residual band table 31 and to assign a VCI number to the thus-updated residual band. The VPCI number and the VCI number are set to the CEI parameter 35, and the IAM including this CEI parameter 35 is sent.

The update of the residual band of the VPC 25 is subtraction of the band requested by a corresponding call from the residual band.

An unoccupied and available number in a corresponding VPC 25 is selected as the VCI number, as required.

Where the ATM exchange 21 has no VPCs 25 for which its selection right is set, or where none of the VPCs 25 for which the selection rights of the ATM exchange 21 are set, have a band effective on a corresponding call and an attribute but the VPC 25s for which the selection rights of the ATM 22 are set, have the band effective on the corresponding call and an attribute, the IAM without the CEI parameter 35 is sent to indicate that effect.

As described above, the message notification section 23A functions as a selection right notification section for notifying the ATM exchange 22 as to which one of the two ATM exchanges has a selection right with regard to each VPC 25.

The message acquisition section 23B receives a message (or the IAA or IAR) which is returned from the message notification section 24A of the control processor 24 in response to the notification of the message notification section 23A.

The IAA or IAR received from the control processor 24 can be formed into; e.g., a message which includes the parameter 30 illustrated in FIG. 9.

The inconsistency section 23C detects information regarding the detection of an inconsistency in the selection right for the VPC 25, from the contents of the parameter 30 in the message (or the IAA or IAR) received from the message acquisition section 23B.

Where the inconsistency still remains unsolved after the inconsistency detection information has been received from the inconsistency detection section 23C, and where the selection right of the ATM exchange 21 for the VPC 25 is changed so as to comply with the selection right specified by the ATM exchange 22, the selection right change section 23D corrects the inconsistency in the setting of the selection rights for the VPC 25, by changing the selection right of the ATM exchange 21 for the VPC 25. In this way, the selection right change section 23D functions as a second selection right change section.

The message acquisition section 24B of the control processor 24 receives the message (IAM) sent from the message notification section 23A of the control processor 23 and acquires VPCI which is information for identifying the VPCs 25 for which the selection rights of the ATM exchange 21 are set (i.e., virtual path connection identification information). In this way, the message acquisition section 24B functions as a virtual path connection information acquisition section.

The inconsistency detection section 24C detects whether or not there is an inconsistency in the setting of the selection right for the VPC 25 by comparing the VPCI number of the VPC 25 for which the selection right of the ATM exchange 22 is set, with the VPCI number acquired by the message acquisition section 24B.

Where the inconsistency detection section 24C has detected an inconsistency in the setting of the selection right for the VPC 25 in a mode in which the selection right of the ATM exchange 22 for the VPC 25 is to be changed so as to comply with the selection right specified by the corresponding (or the other) ATM exchange 21, the selection right change section 24D corrects the inconsistency in the setting of the selection right for the VPC 25 by changing the selection right of the ATM exchange 22 for the VPC 25. In this way, the selection right change section 24D functions as a first selection right change section.

The message notification section 24A sends the previously-described IAA or IAR.

Where the CEI parameter 35 is included in the IAM received by the message acquisition section 24B, and where it is determined by the consistency detection section 24C that the ATM exchange 22 does not have a selection right for the VPC 25 specified by the VPCI number included in the CEI parameter 35, the IAA is sent after the message notification section 24A has checked the effective band of the VPC 25.

More specifically, if the VPCI/VCI numbers included in the CEI parameter 35 are usable (or if the VPC 25 has a band effective on a corresponding call and an attribute), the message notification section 24A updates the residual band of that VPC 25 included in a residual band table 32 (the residual band table 32 is the same as the residual band table 31) which is provided for each VPC 25. Then, the message notification section 24A sends the IAA which includes the parameter 30 (see FIG. 9) that comprises the selection right normally set information and the selection right unchanged information.

Even in a case where the CEI parameter 35 is included in the IAM received by the message acquisition section 24B, if it is determined by the inconsistency detection section 24C that the ATM exchange 22 has a selection right for the VPC 25 specified by the VPCI number included in the CEI parameter 35 (i.e., if there is an inconsistency in the setting of the selection rights for the VPC 25 as a result of the ATM exchanges 21 and 22 having been set so as to select the VPC 25), the ATM exchange 22 cannot use the VPCI/VCI numbers of the specified VPC 25. Therefore, in this case, the message notification section 24A sends the IAR including the parameter 30, which is comprised of the selection right inconsistency present information and the selection right changed/unchanged information, for rejecting the corresponding call.

In contrast, where the IAM received by the message acquisition section 24B does not include the CEI parameter 35, and where one of all the VPCs 25, for which the selection rights of the ATM exchange 22 are set, has a band effective on a corresponding call and an attribute, the message notification section 24A searches for the VPCI/VCI numbers of that VPC 25 and sets the thus-searched VPCI/VCI numbers in the CEI parameter 35. Then, the message notification section 24A sends the IAA including the parameter 30 which is comprised of the selection right inconsistency absence information and the selection right unchanged information.

Further, where the IAM received by the message acquisition section 24B does not include the CEI parameter 35, and where none of all the VPCs 25, for which the selection rights of the ATM exchange 22 are set, has a band effective on a corresponding call and an attribute, the message notification section 24A sends the IAR for rejecting the corresponding call.

Where the IAM received by the message acquisition section 24B does not include the CEI parameter 35, and where it is determined by the inconsistency detection section 24C that the ATM exchange 22 does not have a selection right for the VPC 25 (i.e., if there is an inconsistency in the setting of the selection right for the VPC 25 as a result of the ATM exchanges 21 and 22 having been set such that neither of them has a selection right for the certain VPCs 25), the ATM exchange 22 cannot search for the VPCI/VCI numbers of a corresponding VPC 25 because it does not have any selection right for this VPC 25. Therefore, the message notification section 24A sends the IAR including the parameter 30, which is comprised of the selection right inconsistency present information and the selection right changed/unchanged information, for rejecting the corresponding call.

In the ATM exchanges 21 and 22 of the first modification of the embodiments of the present invention having the previously-described configuration, when the message notification section 23A of the control processor 23 provided for the ATM exchange 21 sends the IAM as the VPC selection right notification message, the message acquisition section 24B of the control processor 24 provided for the ATM exchange 22 receives this IAM. The inconsistency detection section 24C detects a presence or absence of an inconsistency included in the setting of the selection right for the VPC 25 based on the IAM.

Where it is detected that an inconsistency is present in the setting of the selection right for the VPC 25, and the selection right of the ATM exchange 22 for the VPC 25 is changed so as to comply with the selection right specified by the ATM exchange 21, the selection right change section 24D changes the selection right for the VPC 25. Further, where the selection right of the ATM exchange 21 for the VPC 25 is changed so as to comply with the selection right specified by the ATM exchange 22, the selection right change section 24D does not change the selection right for the VPC 25. Then, the message notification section 24A returns the IAA or IAR to the message acquisition section 23B of the control processor 23 as the VPC selection right response message.

When the message acquisition section 23B of the control processor 23 has received the IAA or IAR, the inconsistency detection section 23C determines whether or not an inconsistency is present in the setting of the selection right for the VPC 25 according to the IAA or IAR.

Where it is detected that an inconsistency is present in the setting of the selection right for the VPC 25, and the thus-found inconsistency remains uncorrected (i.e., if the selection right of the ATM exchange 21 for the VPC 25 is changed so as to comply with the selection right specified by the ATM exchange 22), the selection right change section 23D changes the selection right for the VPC 25.

As has been described above, even in the ATM exchanges 21 and 22 of the first modification of the embodiments of the present invention, it is checked whether or not the selection rights of the ATM exchanges 21 and 22 for the VPC 25 are inconsistently set, using the existing messages used in BISUP as the VPC selection right notification message and the VPC selection right response message. If the setting has been found to include an inconsistency, the setting of the selection right for the VPC 25 is corrected. Consequently, the advantageous effects which are the same as those obtained by the previous embodiments can be obtained.

Further, the existing messages used in BISUP are used as the VPC selection right notification message and the VPC selection right response message in the present modification, which makes it possible to prepare a message by use of only the parameters 29 and 30. Therefore, it becomes possible to eliminate useless setting of many types of message to be used in BISUP.

Figure 28:
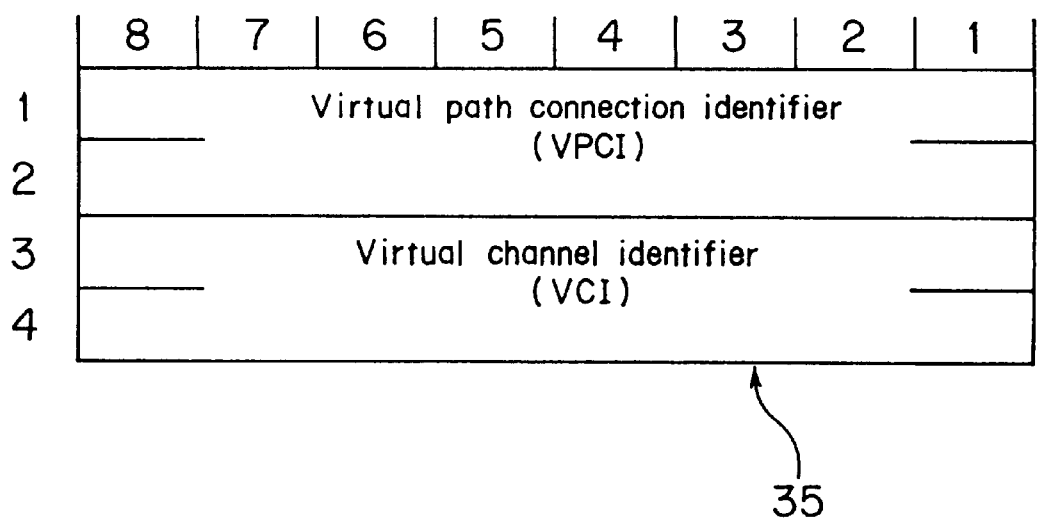
FIG. 28 is a diagram showing the format of a CEI parameter.

Although the present modification has been described with reference to the case where the IAM serving as the VPC selection right notification message is sent in the state the CEI parameter 35 shown in FIG. 28 is included therein, the IAM can be sent in the state in which the parameter 29 shown in FIG. 8 is included therein. Even in this case, the advantageous effects which are the same as those obtained by the ATM exchanges 21 and 22 of the first and second embodiments, can be ensured.

(f) Second Modification of the Embodiments of the Present Invention

The messages including the original parameters 29 and 30 (see FIGS. 8 and 9) which are not defined by the recommendations of ITU-T have been used as the VPC selection right notification message and the VPC selection right response message (see FIG. 7) in the previous embodiments. However, the existing messages used in the (CCP) consistency check procedures defined by the recommendations of ITU-T, can be also used as the VPC selection right notification message and the VPC selection right response message. Even in this case, it is possible to check and correct an inconsistency included in the setting of the selection right for the VPC 25.

Figure 29:
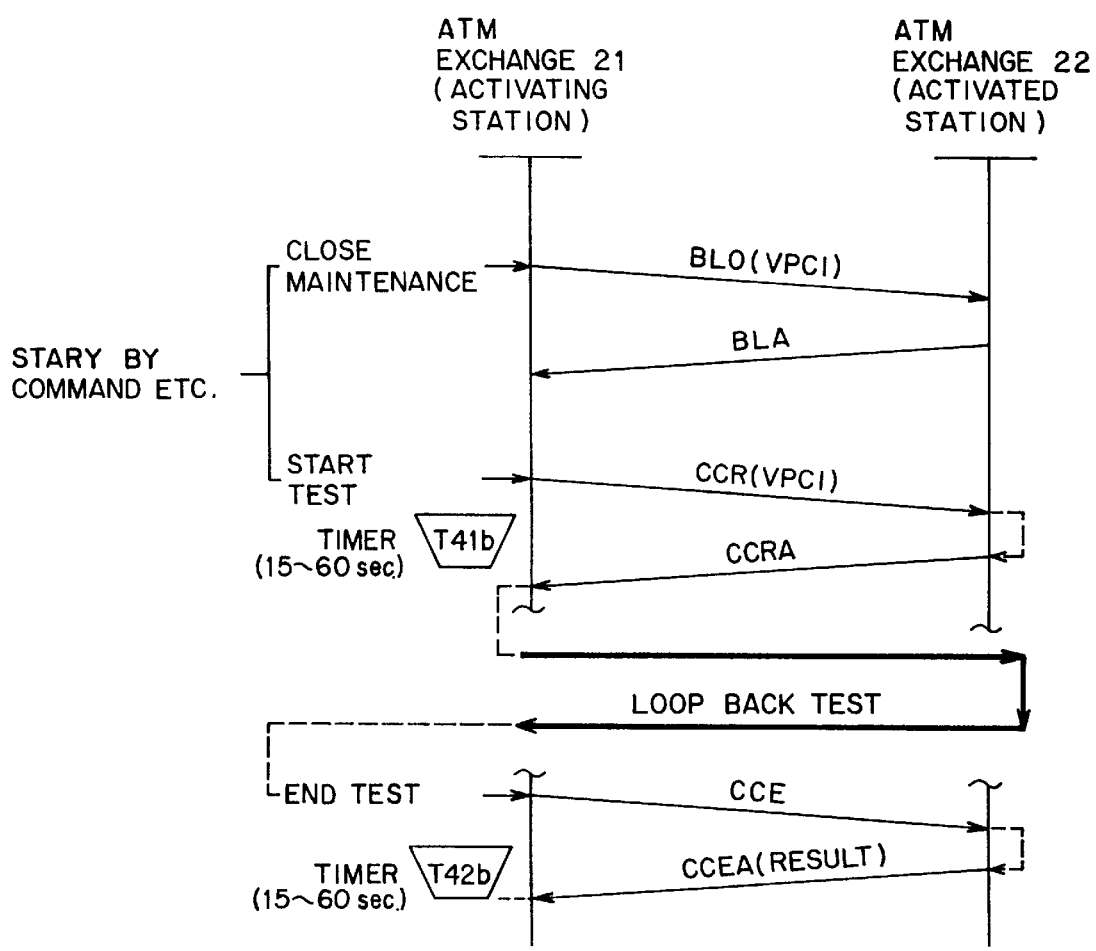
FIG. 29 is a diagram showing a signal sequence used between the ATM exchanges according to a second modification of the embodiments of the present invention.

As illustrated in FIGS. 29 and 30, the messages used in the CCP are as follows: namely, a BLO (Blocking) for closing the VPC 25 for which consistency check is carried out; a BLA (Blocking Acknowledgment) which is a response message with respect to the BLO; a CCR (Consistency Check Request) which is a message for activating the CCP; a CCRA (Consistency Check Request Acknowledgment) which is a response message with respect to the CCR; a CCE (Consistency Check End) which shows the end of the CCP; a CEA (Consistency Check End Acknowledgment) which is a response message with respect to the CCE.

The format of these messages is the same as that shown in FIG. 7.

In the present modification, the CCR of these messages is used as the VPC selection right notification message, and the CCRA is used as the VPC selection right response message.

Figure 33:
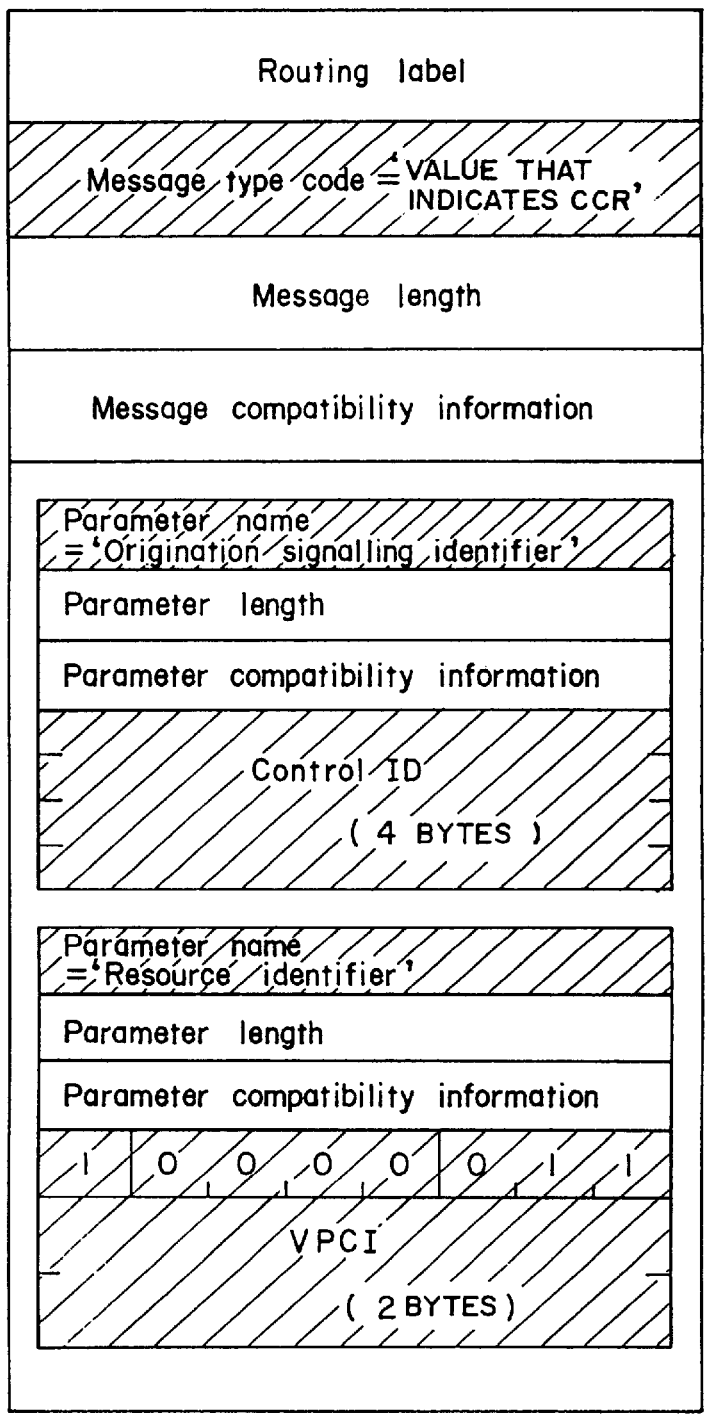
FIG. 33 is a diagram showing the format of the CCR.

Parameters included in the CCR and CCRA are shown in FIGS. 32 and 33. The format of these parameters is also the same as that shown in FIGS. 8 and 9. This format is different from that shown in FIGS. 8 and 9 only in the information to be stored in the contents of the parameters.

Figure 34:
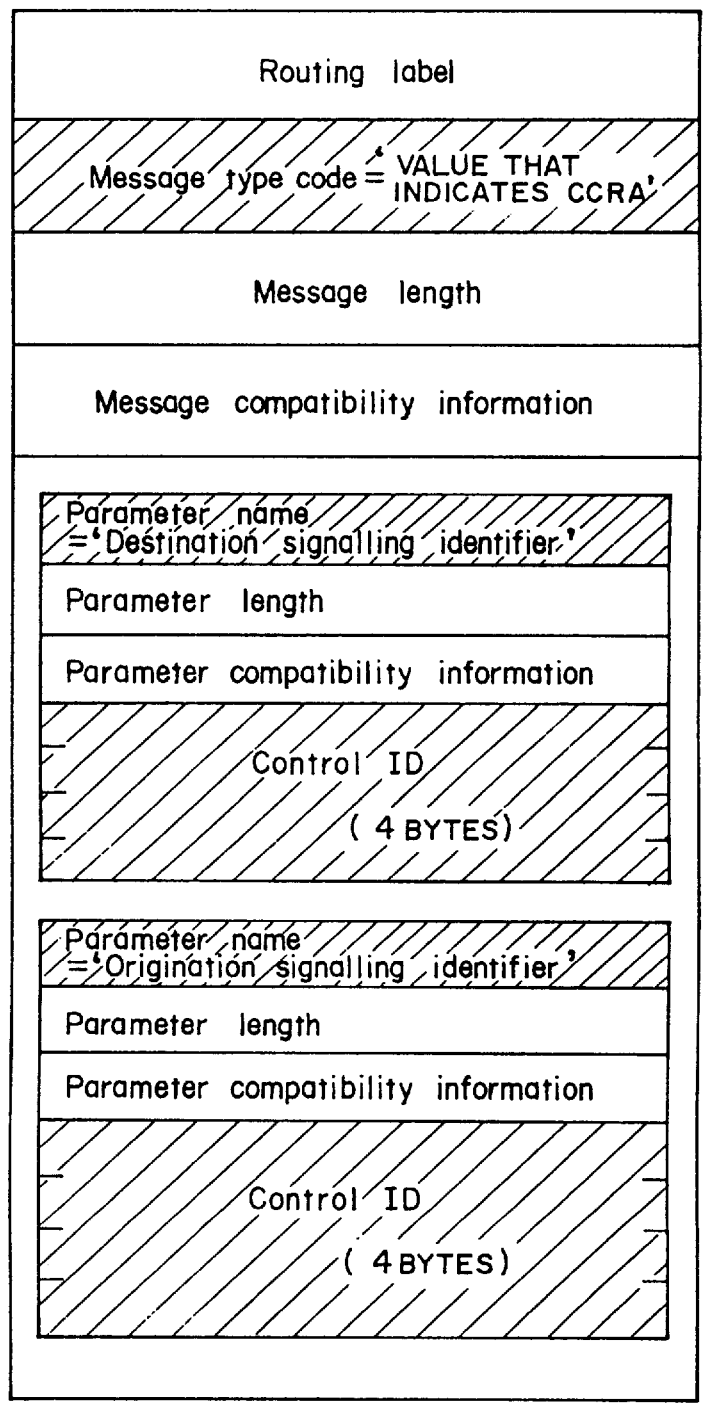
FIG. 34 is a diagram showing the format of the CCRA.

In detail, the CCR and CCRA have the format as shown in FIGS. 33 and 34 (see reference numerals 36 and 37 shown in FIGS. 33 and 34).

In the present embodiment, the CCR includes a parameter which is similar to the parameter 29 as shown in FIG. 8, and the CCRA includes a parameter which is similar to the parameter 30 as shown in FIG. 9, in addition to the previously-described parameters.

More specifically, the VPC selection right notification message and the VPC selection right response message (i.e., the parameters 29 and 30 which are information about the selection rights of the ATM exchanges 21 and 22 for the VPC 25), are included in the CCR and CCRA which are the messages used in carrying out the CCP, or consistency check procedure, defined by the recommendations of ITU-T.

As described above, the CCR and CCRA include the parameters 29 and 30 which are information about the selection rights of the ATM exchanges 21 and 22 for the VPC 25 in the present modification, and hence the CCR and CCRA can be used as messages to be exchanged in order to check and correct the setting of the selection right for the VPC 25 arbitrarily set between the ATM exchanges 21 and 22.

As has been described above, even in the ATM exchanges 21 and 22 of the second modification of the embodiments of the present invention, it is checked whether or not the selection rights of the ATM exchanges 21 and 22 for the VPC 25 are consistently set, through exchange of the messages. If it is detected that the setting includes an inconsistency, the setting of the selection right for the VPC 25 is corrected by changing the selection right of one of the ATM exchanges 21 and 22 for the VPC 25, so as to comply with the selection right specified by the other ATM exchange.

In the present second modification, as illustrated in FIG. 29, the ATM exchange 21 is a sender of the CCR, and the ATM exchange 22 is a receiver of the CCR (i.e., a sender of the CCRA). The control processor 23 provided for the ATM exchange 21 and the control processor 24 provided for the ATM exchange 22 are the same as those used in the previous embodiments with regard to configuration and feature. Therefore, their detailed explanations will be omitted here.

In the ATM exchanges 21 and 22 of the second modification of the embodiments of the present invention having the previously-described arrangements, when the message notification section 23A of the control processor 23 provided for the ATM exchange 21 sends the CCR as the VPC selection right notification message, the message acquisition section 24B of the control processor 24 provided for the ATM exchange 22 receives this CCR. The inconsistency detection section 24C detects a presence or absence of an inconsistency included in the setting of the selection right for the VPC 25 based on the CCR.

Where it is judged that an inconsistency is present in the setting of the selection right for the VPC 25, and the selection right of the ATM exchange 22 for the VPC 25 is changed so as to comply with the selection right specified by the ATM exchange 21, the selection right change section 24D changes the selection right for the VPC 25. Further, where the selection right of the ATM exchange 21 for the VPC 25 is changed so as to comply with the selection right specified by the ATM exchange 22, the selection right change section 24D does not change the selection right for the VPC 25. Then, the message notification section 24A returns the CCRA to the message acquisition section 23B of the control processor 23 as the VPC selection right response message.

When the message acquisition section 23B of the control processor 23 has received the CCRA, the inconsistency detection section 23C determines whether or not an inconsistency is present in the setting of the selection right for the VPC 25 based on the CCRA.

Where it is judged that an inconsistency is present in the setting of the selection right for the VPC 25, and the thus-found inconsistency remains uncorrected (i.e., if the selection right of the ATM exchange 21 for the VPC 25 is changed so as to comply with the selection right specified by the ATM exchange 22), the selection right change section 23D changes the selection right for the VPC 25.

As has been described above, even in the ATM exchanges 21 and 22 of the second modification of the embodiments of the present invention, it is checked whether or not the selection rights of the ATM exchanges 21 and 22 for the VPC 25 are inconsistently set, using the existing messages used in the consistency check procedures (CCP) defined by the recommendations of ITU-T, as the VPC selection right notification message and the VPC selection right response message. If it is detected that the setting includes an inconsistency, the setting of the selection right for the VPC 25 is corrected. Consequently, the advantageous effects which are the same as those obtained by the ATM exchanges 21 and 22 of the previous embodiments can be obtained.

Further, the VPC selection right notification message and the VPC selection right response message (i.e., the parameters 29 and 30 which are information about the selection rights of the ATM exchanges 21 and 22 for the VPC 25) are included in the CCR and CCRA which are the existing messages used in carrying out the CCP, or consistency check procedures, specified by the recommendations of ITU-T, which makes it possible to prepare a message. Therefore, it becomes possible to eliminate useless setting of many types of message to be used in BISUP.

(g) Others

As has been described in the previous embodiments and modifications, the ATM exchanges 21 and 22 of the present invention make it possible to change the VPC 25 selection right of the ATM exchange 22 so as to comply with the selection right specified by the ATM exchange 21; to change the VPC 25 selection right of the ATM exchange 21 so as to comply with the selection right specified by the ATM exchange 22; or to change or arbitrarily select the selection rights of the ATM exchanges 21 and 22 for the VPC 25 in accordance with the SPC numbers assigned to the ATM exchanges 21 and 22, so as to comply with the selection right specified by one of the ATM exchanges 21 and 22. Therefore, it is possible to check and correct the selection right for the VPC 25 according to the state of the network.

What is claimed is:

1. A method of checking whether selection rights for one or more virtual path connections presently set between a pair of fixed-length cell handling exchanges are inconsistent in the setting, said method comprising the steps of:

for each of the virtual path connections,
at one fixed-length cell handling exchange,
(a) notifying the other fixed-length cell handling exchange of, as a first message, information as to which of the two fixed-length cell handling exchanges has a selection right for the virtual path connection:

at the other fixed-length cell handling exchange,
(b) checking, based on said first message, whether or not an inconsistency is present in the setting of the selection rights; and
(c) sending to said one fixed-length cell handling exchange information about the result of said checking, as a second message.

2. The method according to claim 1, wherein if each of the two fixed-length cell handling exchanges is set so as not to have selection rights for any virtual path connection, or if each of the two fixed-length cell handling exchanges is set so as to have selection rights for any virtual path connection, said checking is carried out as to whether or not an inconsistency is present in the setting of the selection rights.

3. The method according to claim 1, wherein each of said first and second messages is a unique message which complies with a standardized inter-exchange scheme.

4. The method according to claim 3, wherein said first and second messages have a common message identifier.

5. The method according to claim 1, wherein said first and second messages are included in a message to be used in carrying out inconsistency checking procedures designated by a standardizing organization.

6. The method of checking virtual-path-connection selection rights of fixed-length cell handling exchanges according to claim 1, wherein when a virtual path connection is newly or additionally provided between the two fixed-length cell handling exchanges and no inconsistency is present in the setting of selection rights of the fixed-length cell handling exchanges for the thus-provided virtual path connection before the virtual path connection becomes available for call/connection, the virtual path connection is brought into a state of being usable for call/connection.

7. The method of checking virtual-path-connection selection rights of fixed-length cell handling exchanges according to claim 1, wherein when a virtual path connection provided between the two fixed-length cell handling exchanges is in a state of being usable for call/connection and an inconsistency is present in the setting of selection rights of the fixed-length cell handling exchanges for the virtual path connection, the virtual path connection is brought into a state of being unusable for call/connection.

8. A method of checking whether selection rights for one or more virtual path connections presently set between a pair of fixed-length cell handling exchanges are inconsistent in the setting, and correcting the setting if an inconsistency is found therein, said method comprising the steps of:

for each of the virtual path connections,
at one fixed-length cell handling exchange,
(a) notifying the other fixed-length cell handling exchange of, as a first message, information as to which of the two fixed-length cell handling exchanges has a selection right for the virtual path connection:
at the other fixed-length cell handling exchange,
(b) checking, based on said first message, whether or not an inconsistency is present in the setting of the selection rights:
(c) sending to said one fixed-length cell handling exchange information about the result of said checking, as a second message; and
if said second message indicates that an consistency is present in the setting of the selection rights,
at the two fixed-length cell handling exchanges,
(d) changing the selection rights for the virtual path connection so as to comply with those designated by any one of the fixed-length cell handling exchanges.

9. The method according to claim 8, wherein when it is detected that an inconsistency is present in the setting of selection rights, the selection rights to said other fixed-length cell handling exchange for the virtual path connections are changed so as to comply with those designated by said one fixed-length cell handling exchange.

10. The method according to claim 8, wherein when it is detected that an inconsistency is present in the setting of selection rights, the selection rights of the two fixed-length cell handling exchanges for the virtual path connections are changed so as to comply with those designated by one of the two fixed-length cell handling exchanges, according to the identification numbers assigned to the respective fixed-length cell handling exchanges.

11. The method according to claim 8, wherein when it is detected that an inconsistency is present in the setting of selection rights, the selection rights to the two fixed-length cell handling exchanges for the virtual path connections are changed so as to comply with those designated by one of the two fixed-length cell handling exchanges, according to identification numbers assigned to the respective fixed-length cell handling exchanges.

12. The method according to claim 8, wherein each of said first and second messages is a unique message that complies with a standardized inter-exchange scheme.

13. The method according to claim 12, wherein said first and second messages have a common message identifier.

14. The method according to claim 8, wherein said first and second messages are included in a message used in carrying out inconsistency checking procedures designated by a standardizing organization.

15. A fixed-length cell handling exchange in which one or more virtual path connections are established with a companion fixed-length cell handling exchange which designates selection rights for at least part of the virtual path connections, said exchange comprising:

a first virtual path connection information acquisition section for acquiring information about the virtual path connections for which selection rights are set to said fixed-length cell handling exchange;

a second virtual path connection information acquisition section for acquiring information about the virtual path connections for which selection rights are set to the companion fixed-length cell handling exchange:

an inconsistency detection section for checking, based on the virtual path connection information acquired by said first and second virtual path connection information acquisition sections, whether or not an inconsistency is present in the setting of the selection rights of the two fixed-length cell handling exchanges; and a selection right change section for changing the selection rights for the virtual path connections so as to comply with those designated by the companion fixed-length cell handling exchange, if said inconsistency detection section finds an inconsistency in the setting of the selection rights.

16. A fixed-length cell handling exchange in which one or more virtual path connections are established with a companion fixed-length cell handling exchange which designates selection rights for at least part of the virtual path connections, said exchange comprising:

a selection right information notification section for notifying the companion fixed-length cell handling exchange of information as to which one of the two exchanges has a selection right for the individual virtual path connection; and a selection right change section for changing the selection rights to the two fixed-length cell handling exchanges for said individual path connection so as to comply with those designated by the companion fixed-length cell handling exchange, upon receipt of information, from the companion fixed-length cell handling exchange, that an inconsistency has been found to be present in the setting of the selection rights as an answer to said information notified by said selection right information notification section.

17. The method according to claim 1, further comprising the step of: for each of the virtual path connections, at said one fixed-length cell handling exchange, acquiring, before said notifying, the first-mentioned information to be notified to the other fixed-length cell handling exchange as said first message.

18. The method according to claim 8, further comprising the step of: for each of the virtual path connections, at said one fixed-length cell handling exchange, acquiring, before said notifying, the first-mentioned information to be notified to the other fixed-length cell handling exchange as said first message.

* * * * *